(12) United States Patent
Doi et al.

(10) Patent No.: US 9,707,944 B2
(45) Date of Patent: Jul. 18, 2017

(54) BRAKING FORCE CONTROL SYSTEM

(71) Applicant: HONDA MOTOR CO., LTD., Minato-ku, Tokyo (JP)

(72) Inventors: Shigeru Doi, Wako (JP); Akio Shimoda, Wako (JP); Hisanori Yanagida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/034,272

(22) PCT Filed: Nov. 7, 2014

(86) PCT No.: PCT/JP2014/079575
§ 371 (c)(1),
(2) Date: May 4, 2016

(87) PCT Pub. No.: WO2015/068800
PCT Pub. Date: May 14, 2015

(65) Prior Publication Data
US 2016/0264111 A1 Sep. 15, 2016

(30) Foreign Application Priority Data

Nov. 8, 2013 (JP) ................. 2013-232114
Nov. 8, 2013 (JP) ................. 2013-232549

(51) Int. Cl.
*B60T 8/1766* (2006.01)
*B60T 8/26* (2006.01)
*B60T 8/40* (2006.01)

(52) U.S. Cl.
CPC ............ *B60T 8/1766* (2013.01); *B60T 8/267* (2013.01); *B60T 8/4081* (2013.01); *B60T 2270/602* (2013.01); *B60T 2270/604* (2013.01)

(58) Field of Classification Search
CPC ......... B60T 2270/602; B60T 2270/604; B60T 8/1766; B60T 8/267; B60T 8/4081
USPC ........................................................... 701/70
See application file for complete search history.

(56) References Cited

U.S. PATENT DOCUMENTS 5,318,355 A * 6/1994 Asanuma ................ B60L 3/108
                                                          180/165
5,322,352 A * 6/1994 Ohno ......................... B60L 7/26
                                                          188/156
5,399,000 A * 3/1995 Aoki ......................... B60L 7/26
                                                          180/165

(Continued)

FOREIGN PATENT DOCUMENTS

JP         H01-58203 U        4/1989
JP         H04-289702 A       10/1992

(Continued)

*Primary Examiner* — Tyler J Lee
(74) *Attorney, Agent, or Firm* — Carrier Blackman & Associates, P.C.; William D. Blackman; Joseph P. Carrier

(57) ABSTRACT

Motor-generators are arranged both at front and rear wheels so as to be capable of using all of four wheels for regeneration. The horizontal axis indicates deceleration of a vehicle, and the vertical axis indicates braking forces for the front and rear wheels, respectively above and below the horizontal axis. A setting value indicates a limit braking force for the rear wheels to be locked. A frictional braking force and a regenerative braking force at the rear wheels are controlled so that the total braking force for the rear wheels does not exceed the setting value.

8 Claims, 14 Drawing Sheets

(56) References Cited

U.S. PATENT DOCUMENTS

| | | | | |
|---|---|---|---|---|
| 7,001,306 B2* | 2/2006 | Suzuki | ................... | B60K 6/44 477/183 |
| 2004/0162187 A1* | 8/2004 | Suzuki | ................... | B60K 6/44 477/182 |
| 2007/0057574 A1* | 3/2007 | Mizutani | ............... | B60T 8/1766 303/155 |

FOREIGN PATENT DOCUMENTS

| JP | 2003-306137 A | 10/2003 |
|---|---|---|
| JP | 2004-268901 A | 9/2004 |
| JP | 2011-189912 A | 9/2011 |
| JP | 2013-183502 A | 9/2013 |

\* cited by examiner

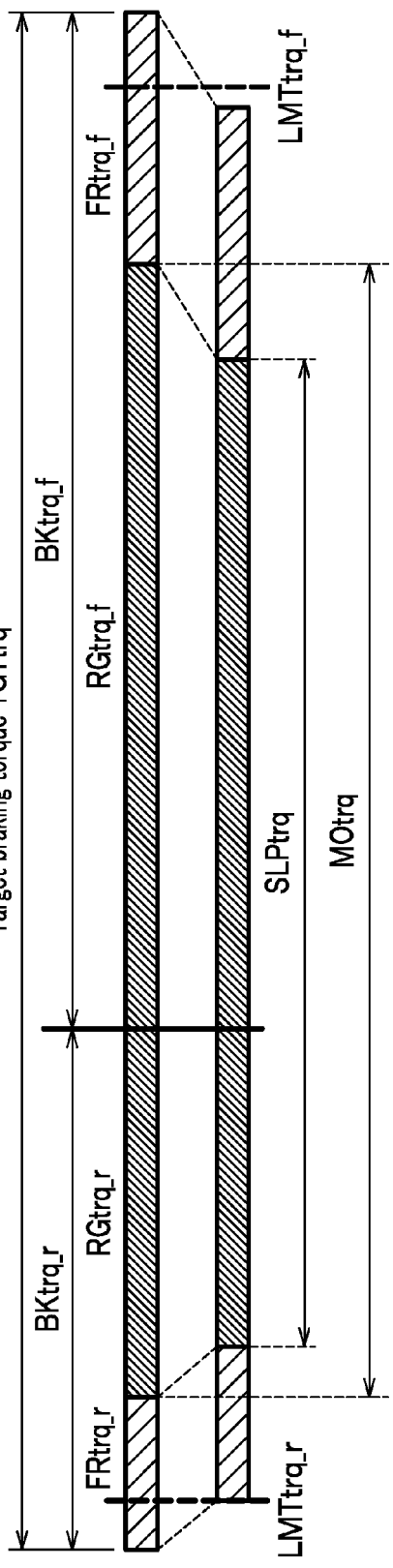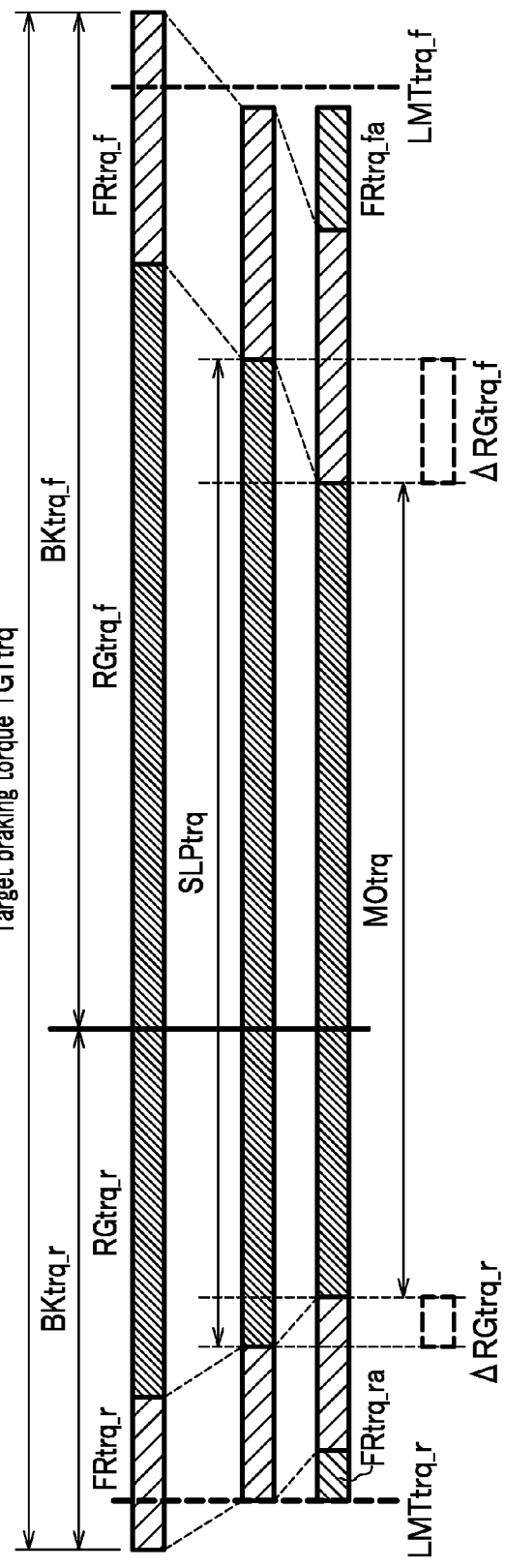

BRAKING FORCE CONTROL SYSTEM

CROSS REFERENCE TO RELATED APPLICATIONS

This application is a U.S. National Stage Application under 35 U.S.C. §371 of International Patent Application No. PCT/JP2014/079575 filed 7 Nov. 2014, which claims the benefit of priority to Japanese Patent Application No. 2013-232114 filed 8 Nov. 2013 and Japanese Patent Application No. 2013-232549 filed 8 Nov. 2013, the disclosures of all of which are hereby incorporated by reference in their entireties.

TECHNICAL FIELD

The present invention relates to a braking force control system.

BACKGROUND ART

The Japanese Patent Application Publication No. 2004-268901 discloses a technique of distributing engine brake torque to front wheels and rear wheels in accordance with an ideal braking-torque distribution in a four-wheel drive vehicle which drives front wheels by an engine and rear wheels by a motor for suppressing either the front wheels or the rear wheels from being locked.

SUMMARY OF THE INVENTION

Problems to be Solved

However, for braking a vehicle having the front and rear wheels, if the rear wheels are locked ahead of the front wheels, the vehicle may have unstable behavior. Adversely, even if the front wheels are locked ahead of the rear wheels, the vehicle will less likely have unstable behavior than the case of the rear wheels being locked ahead of the front wheels.

To cope with this situation, the technique of the Japanese Patent Application Publication No. 2004-268901 simply distributes the engine brake torque to the front wheels and the rear wheels in accordance with the ideal brake-torque distribution, and takes no account of a point that a vehicle using the regenerative braking force prevents the rear wheels from being locked ahead of the front wheels to ensure the vehicle to have stable behavior.

Then, the present invention is intended to provide a braking force control system that is capable of ensuring the vehicle to have stable behavior.

Solution to Problems

An aspect of the present invention is a braking force control system that include: a regenerative braking force controller that controls a regenerative braking force for rear wheels of a vehicle, which is generated by a first motor-generator for driving the rear wheels; a frictional braking force controller that controls a frictional braking force to be generated by the rear wheels of the vehicle; and a braking force determiner that determines the frictional braking force and the regenerative braking force inclusive of a braking force equivalent to an engine brake, so that a total braking force to be applied to the rear wheels does not exceed a preset value.

According to the present invention, the total braking force of the frictional braking force and regenerative braking force for the rear wheels is controlled so as not to exceed the preset value for preventing the rear wheels from being locked ahead of the front wheels. This allows for ensuring the vehicle to have stable behavior.

In addition, while the frictional braking force can only have linear output characteristics, the regenerative braking force can be adjusted by a motor-generator having high controllability so that the total braking force does not exceed the preset value.

In this case, the braking force determiner may set the preset value based on the ideal braking-force distribution to the rear wheels, with which the rear wheels are not locked.

According to the present invention, the total braking force for the rear wheels of the frictional braking force and regenerative braking force does not exceed the value which is set in advance based on the ideal braking-force distribution for the rear wheels, to prevent the rear wheels from being locked ahead of the front wheels.

Still in this case, the braking force determiner may set the preset value so as to be smaller than a limit value of the braking force for the front wheels of the vehicle to be locked.

According to the present invention, the total braking force for the rear wheels of the frictional braking force and regenerative braking force can be limited to a value smaller than the limit value of the braking force for the front wheels to be locked, to prevent the rear wheels from being locked ahead of the front wheels.

Still in this case, the regenerative braking force controller may also control the regenerative braking force for the front wheels to be generated by a second motor-generator for driving the front wheels of the vehicle; the frictional braking force controller may also control the frictional braking force to be generated by the front wheels of the vehicle; and the braking force determiner may set in advance distributions to the frictional braking forces of the frictional braking force to be generated by the front wheels and the frictional braking force to be generated by the rear wheels, and, on the condition that a deceleration of the vehicle is within a predetermined range, make the distribution of the frictional braking force to be generated by the rear wheels, in accordance with the preset distribution, smaller than the limit value for the rear wheels to be locked, and make the distribution of the frictional braking force to be generated by the front wheels larger than a limit value for the front wheels to be locked.

According to the present invention, the front wheels can securely be locked ahead of the rear wheels.

Still in this case, the regenerative braking force controller may also control the regenerative braking force for the front wheels to be generated by the second motor-generator for driving the front wheels of the vehicle; and the frictional braking force controller may also control the frictional braking force to be generated by the front wheels of the vehicle, include a slip state detector for detecting that the vehicle is slipping, and, on the condition that the slip state detector detects that the vehicle for which the regenerative braking force is being generated is slipping, reduce at a predetermined ratio the regenerative braking force being applied to the front wheels and the regenerative braking force being applied to the rear wheels.

According to the present invention, the regenerative braking forces being applied to the front and rear wheels are reduced on the condition that the vehicle is slipping for which the regenerative braking force is being generated. This allows for recovering grip forces of the front and rear wheels. In addition, the regenerative braking forces to be reduced at the front and rear wheels have a predetermined ratio. For example, on the condition that the regenerative braking forces to be applied to the front and rear wheels have an ideal distribution ratio, the regenerative braking forces to be reduced at the front and rear wheels may also have the ideal distribution ratio (proportion). In this case, the regenerative braking forces after the reduction are also distributed to the front and rear wheels at the ideal distribution ratio. Accordingly, the vehicle has stable behavior at the time of braking.

In this case, the predetermined ratio may be the ideal distribution ratio for distributing the frictional braking force to the front and rear wheels.

According to the present invention, the regenerative braking forces to be reduced at the front and rear wheels on the condition that the vehicle is slipping can have the ideal distribution ratio (proportion), to make the regenerative braking forces after the reduction also distributed to the front and rear wheels at the ideal distribution ratio. Accordingly, the vehicle has stable behavior at the time of braking.

Still in this case, the predetermined ratio is set so that the sum of the frictional braking force and regenerative braking force to be applied to the rear wheels does not exceed a limit braking force for the rear wheels to be locked.

According to the present invention, the regenerative braking force distributed and applied to the rear wheels does not exceed the limit braking force, to avoid slipping because of the rear wheels being locked. Accordingly, the vehicle has stable behavior at the time of braking.

Still in this case, the braking force control system may further include an ABS controller that executes antilock brake control for reducing the frictional braking force upon detecting that the vehicle is slipping, and the slip state detector may detect that the vehicle is slipping, to reduce the regenerative braking forces to be applied to the front and rear wheels, with a variation in a vehicle condition which is smaller than that of the ABS controller detecting that the vehicle is slipping.

According to the present invention, the slip state detector can detect that the vehicle is slipping earlier than the ABS controller, which executes the antilock brake control. That is, the slip state detector can detect a slip smaller than that detected by the ABS controller, which executes the antilock brake control. Accordingly, the regenerative braking forces applied to the front and rear wheels are reduced before the antilock brake control is executed, to allow the vehicle to have stable behavior at the time of braking.

Still in this case, if an accelerator pedal is stepped for operation at a time of the slip state detector detecting that the vehicle is slipping, a traveling mode is switched to one in which the front and rear wheels are driven by the first and second motor-generators, respectively.

According to the present invention, the vehicle is allowed to have a stable traveling even on a slippery road, such as a low-ρ road, and therefore stable behavior at a time of braking.

Advantageous Effects of the Invention

The present invention can provide a braking force control system that allows a vehicle to have stable behavior.

BRIEF DESCRIPTION OF THE DRAWINGS

FIG. 9A shows a rear-wheel EV traveling, FIG. 9B shows a front-wheel EV traveling, and FIG. 9C shows a four-wheel EV traveling;

FIG. 14A is a chart indicating braking torques in a case where a generable regenerative torque is greater than a slip-avoidance regenerative torque in the second embodiment of the present invention; and FIG. 14B is a chart indicating braking torques in a case where the generable regenerative torque is smaller than the slip-avoidance regenerative torque in the second embodiment of the present invention.

DETAILED DESCRIPTION OF EMBODIMENTS

First Embodiment

Hereinafter, embodiments of the present invention will be described with reference to accompanying drawings.

Figure 1:
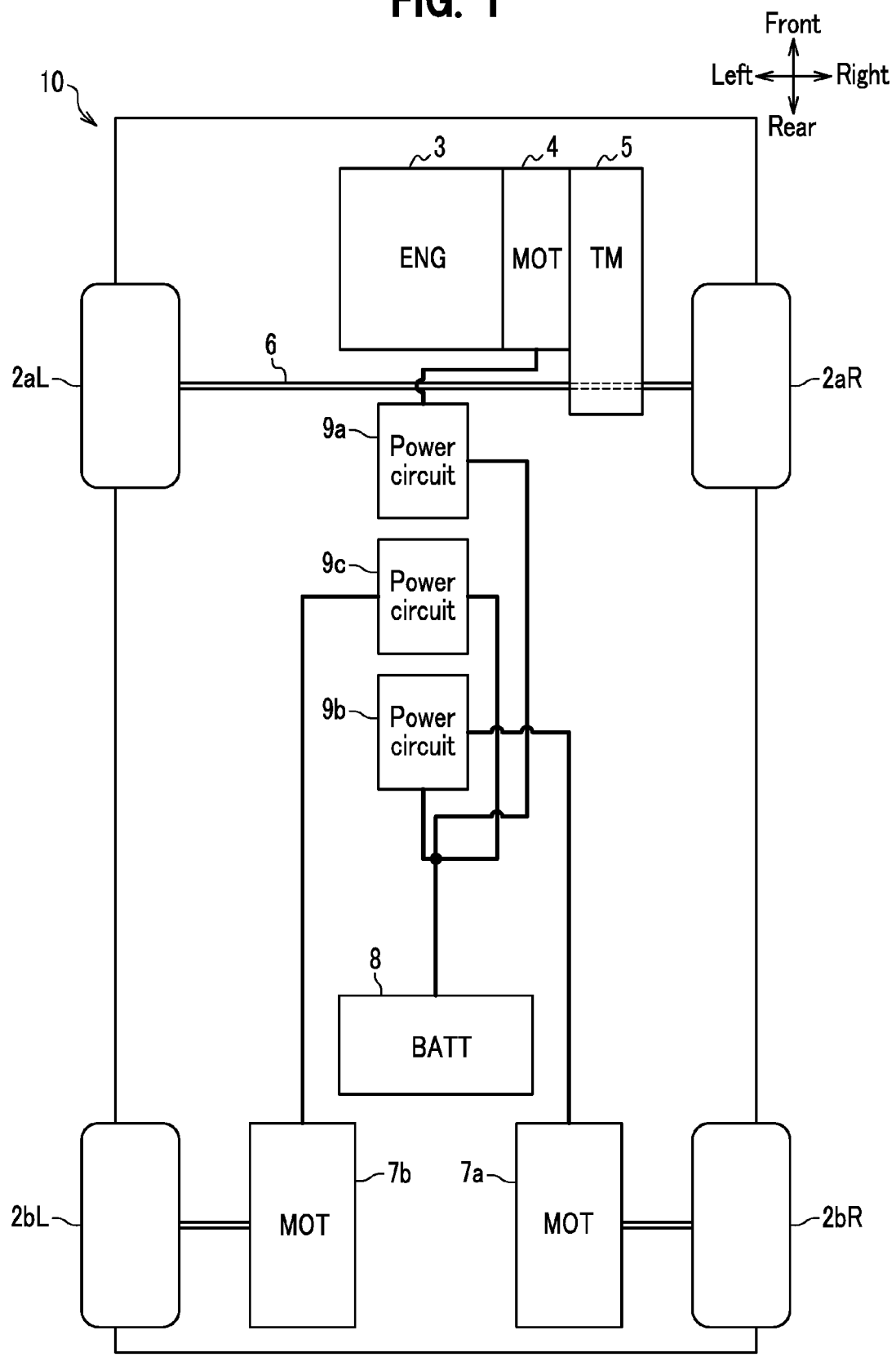
FIG. 1 is a system diagram of main parts of a vehicle in a first embodiment of the present invention.

FIG. 1 is a system diagram of main parts of a vehicle 10 in a first embodiment of the present invention. The vehicle 10 is, for example, a hybrid vehicle of four-wheel drive, including a pair of right and left front wheels 2aR, 2aL arranged on a front side of the vehicle 10 and a pair of right and left rear wheels 2br, 2bL arranged on a rear side of the vehicle 10.

The vehicle 10 is, for example, a parallel hybrid vehicle which includes an engine 3, a front-wheel motor-generator 4 (second motor-generator), and a transmission 5, all being connected such as in series, and driving forces of the engine 3 and the front-wheel motor-generator 4 are distributed and transmitted to the right and left front wheels 2aR, 2aL arranged on an axle 6 via the transmission 5 and a differential (not shown). The front wheels 2aR, 2aL of the vehicle 10 may be driven only by the engine 3, only by the front-wheel motor-generator 4, or cooperatively by the engine 3 and the front-wheel motor-generator 4.

In addition, rear-wheels motor-generators 7a, 7b (first motor-generator) are arranged at rear portions of the vehicle, where the rear-wheel motor-generator 7a can drive the rear wheel 2bR and the rear-wheel motor-generator 7b can drive the rear wheel 2bL, respectively.

A battery 8 mounted on the vehicle 10, such as at a rear portion thereof, is a secondary battery which exchanges power with the front-wheel and rear-wheel motor-generators 4, 7a, 7b. The battery 8 is connected with power supply lines to the front-wheel and rear-wheel motor-generators 4, 7a, 7b via power supply circuits 9a, 9b, 9c, respectively. All the power supply circuits 9a, 9b, 9c include inverter circuits for converting DC power of the battery 8 into three-phase AC power to supply it to the front-wheel and rear-wheel motor-generators 4,7a, 7b. In addition, the battery 8 stores power regenerated by the front-wheel and rear-wheel motor-generators 4,7a, 7b.

A description will be given of an exemplary driving of the vehicle 10 for traveling. The vehicle 10 starts traveling only by the rear-wheel motor-generators 7a, 7b driving the rear wheels 2bR, 2bL. After the speed increases to reach a desired level, the vehicle 10 travels only with a driving force of the engine 3. For acceleration, the engine 3 is assisted by the front-wheel motor-generator 4, and further, the rear-wheel motor-generators 7a, 7b are driven for the vehicle 10 to travel in a four-wheel drive mode. For deceleration, all the front-wheel and rear-wheel motor-generators 4, 7a, 7b execute regenerative operation, for example, to accumulate the regenerative power in the battery 8.

Figure 2:
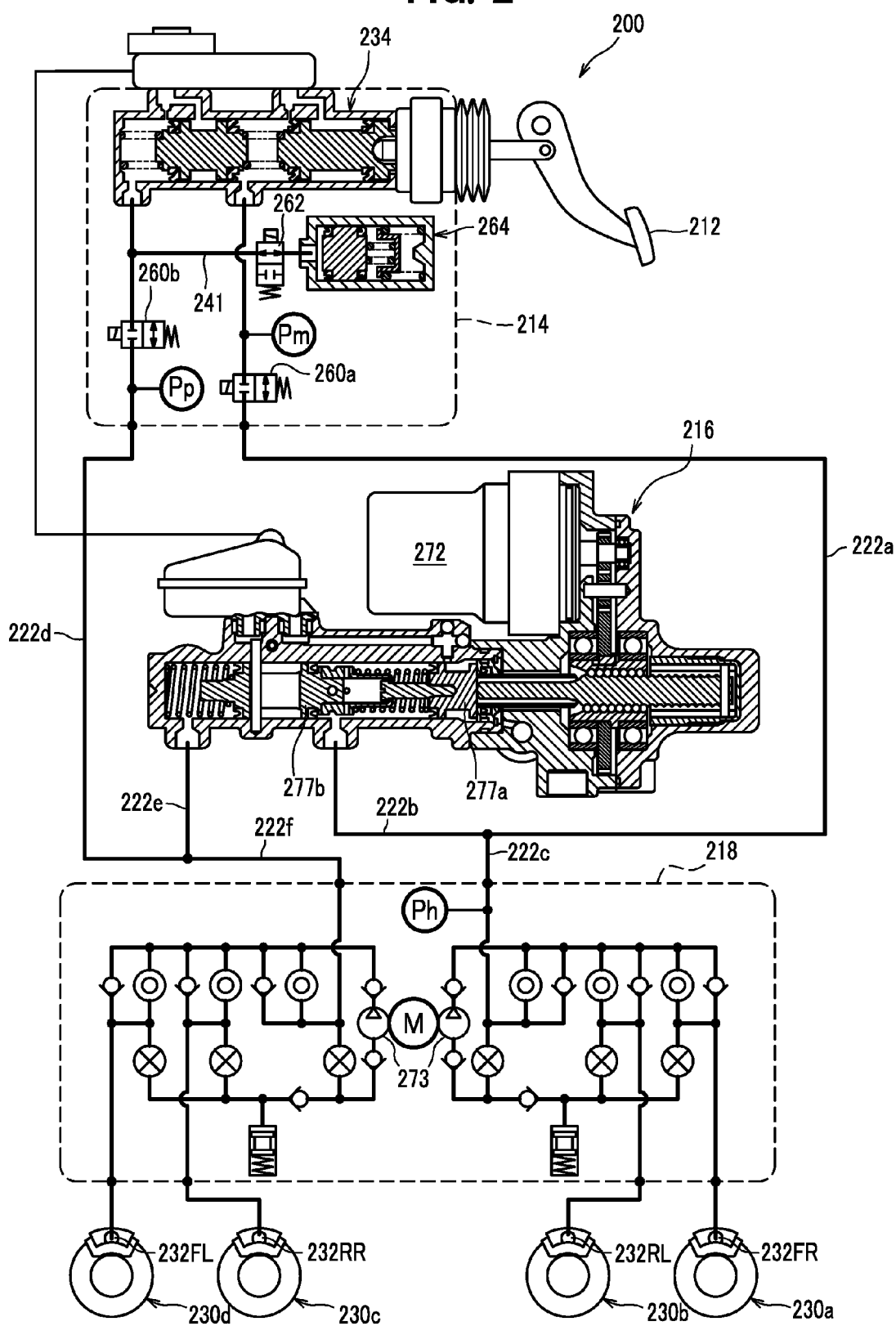
FIG. 2 is a block diagram showing an outline of a braking device mounted on a vehicle in the first embodiment of the present invention.

FIG. 2 is a block diagram showing an outline of a braking device 200 mounted on the vehicle 10. The braking device 200 is a device that generates a frictional braking force of the vehicle by a so-called brake-by-wire system.

The brake device 200 includes: an input device 214 inclusive of a master cylinder 234 that converts a pedaling force inputted by a driver operating a brake pedal 212 to a brake fluid pressure; a motor cylinder device 216 that generates a brake fluid pressure in response to, or irrelevant to, the brake fluid pressure generated in the master cylinder 234; a vehicle behavior stabilizer 218; and disc brake mechanisms 230a to 230d. The motor cylinder device 216 includes first and second slave pistons 277a, 277b that are driven by an electric motor 272 to generate a brake fluid pressure.

Note that brake fluid pressure sensors Pm, Pp, Ph are arranged on pipes 222a to 222f for respectively detecting the brake fluid pressure therein. In addition, the vehicle behavior stabilizer 218 includes a pump 273 for pressuring the brake fluid.

The motor cylinder device 216 is, via the vehicle behavior stabilizer 218, connected from: a wheel cylinder 232FR that generates by the fluid pressure a frictional braking force in the disc brake mechanism 230a arranged at the front right wheel 2aR of the vehicle, not shown; a wheel cylinder 232RL that generates by the fluid pressure a frictional braking force in the disc brake mechanism 230b arranged at the rear left wheel 2bL; a wheel cylinder 232RR that generates by the fluid pressure a frictional braking force in the disc brake mechanism 230c arranged at the rear right wheel 2bR; and a wheel cylinder 232FL that generates by the fluid pressure a frictional braking force in the disc brake mechanism 230d arranged at the front left wheel 2aL.

Next, a description will be given of basic operation of the braking device 200. In the braking device 200, on the condition that the motor cylinder device 216 and a control system for controlling by-wire operation normally operate, the so-called by-wire brake system is actuated in response to the driver stepping a brake pedal 212. Specifically, in the braking device 200 in a state of normal operation, in response to the driver stepping the brake pedal 212 (detected by a brake pedal stroke sensor 13 to be described later), the motor cylinder device 216 actuates the disc brake mechanisms 230a to 230d using the brake fluid pressure generated by driving the motor 272 to brake respective wheels, in a state where the first shut-off valve 260a and the second shut-off valve 260b shut a communication off between the master cylinder 234 and the disc brake mechanisms 230a to 230d (wheel cylinders 232FR, 232RL, 232RR, 232FL) which brake the respective wheels.

In addition, during the normal operation, while the first shut-off valve 260a and the second shut-off valve 260b are shut off, a third shut-off valve 262 is opened to allow the brake fluid to flow from the master cylinder 234 into a stroke simulator 264, that is, the brake fluid is moved even if the first shut-off valve 260a and the second shut-off valve 260b are shut off, to generate a stroke for a pedal reaction force in response to the brake pedal 212 being stepped.

If the braking system 200 has a failure such as the motor cylinder device 216 being inoperative, a conventional hydraulic brake system is actuated in response to the driver stepping the brake pedal 212. Specifically, the braking device 200 in failure operates in response to the driver stepping the brake pedal 212 so as to open the first shut-off valve 260a and the second shut-off valve 260b, respectively, and close the third shut-off valve 262 to transmit the brake fluid pressure generated by the master cylinder 234 to the disc brake mechanisms 230a to 230d (wheel cylinders 232FR, 232RL, 232RR, 232FL) for actuating the disc brake mechanism 230a to 230d (wheel cylinders 232FR, 232RL, 232RR, 32FL) to brake the respective wheels 2aR, 2aL, 2bR, 2bL.

Configuration and operation are well known for the input device 214, the motor cylinder device 216, and the vehicle behavior stabilizer 218, and then detailed description thereof will be omitted.

Figure 3:
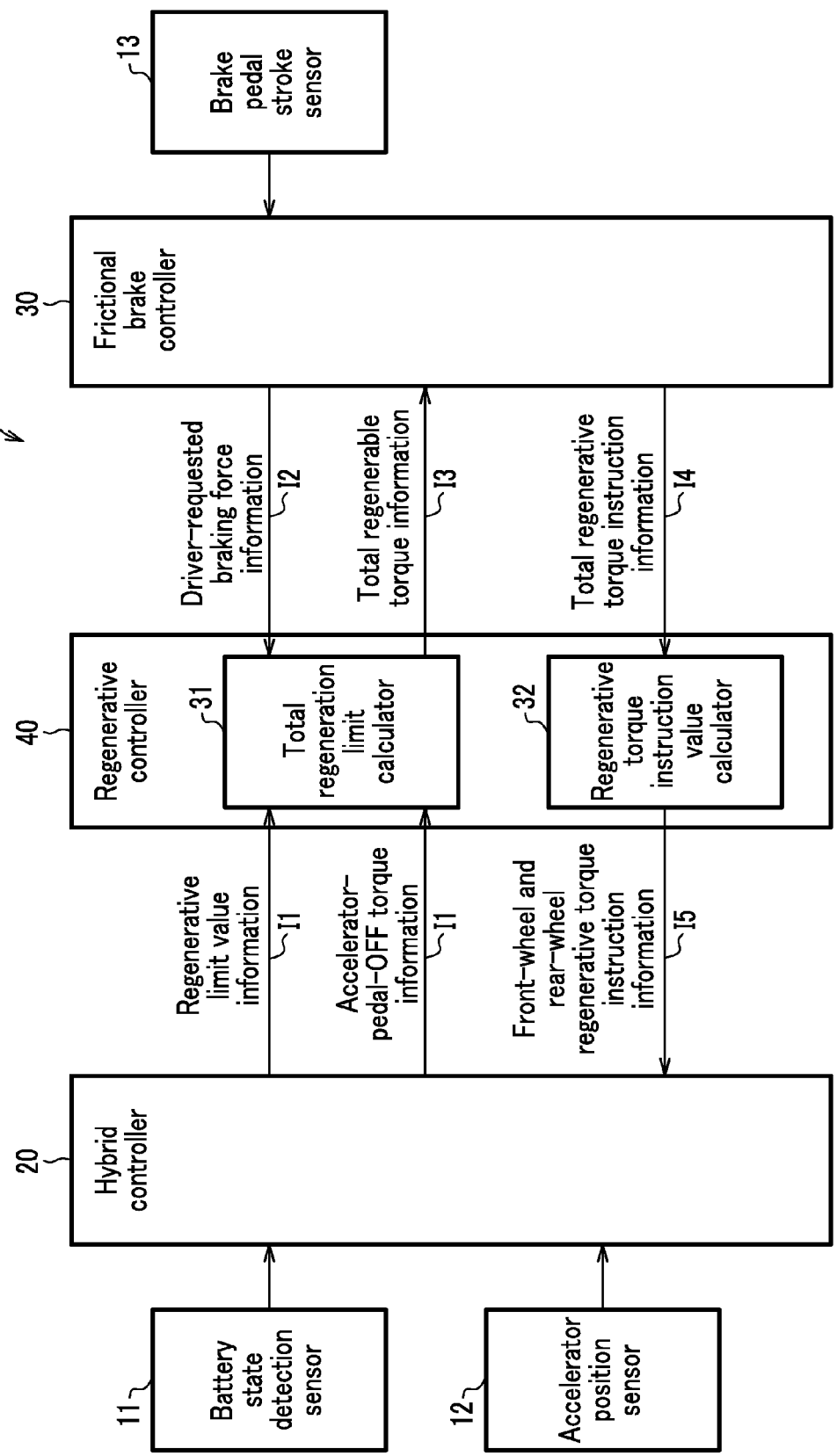
FIG. 3 is a block diagram illustrating a control system of a braking force control system for a vehicle according to the first embodiment of the present invention.

FIG. 3 is a block diagram illustrating a control system of the braking force control system of the vehicle 10. A braking force control system 1 includes a hybrid controller 20, a frictional brake controller 30, and a regenerative controller 40.

The hybrid controller 20 (regenerative braking force controller) is an Electronic Control Unit (ECU) for controlling a hybrid drive system of the vehicle 10. That is, the hybrid controller 20 controls a drive system which mainly includes the engine 3 and the front-wheel and rear-wheel motor-generators 4, 7a, 7b.

More specifically, various sensors and various actuators for driving the engine 3 are connected to the hybrid controller 20. In particular, the hybrid controller 20 is connected from a battery state detection sensor 11 (composed of a current sensor, a voltage sensor, a temperature sensor etc.) for detecting a State Of Charge (SOC) of the battery 8, and an accelerator position sensor 12 for detecting an accelerator position made by the accelerator pedal (not shown) of the vehicle 10. This allows the hybrid controller 20 to control, for driving the engine 3, an ignition mechanism, a fuel system such as a fuel device, an intake and exhaust system such as a throttle position, a valve operation mechanism such as a valve timing, and a starting mechanism.

In addition, the front-wheel and rear-wheel motor-generators 4, 7a, 7b, the battery 8, various sensors for driving the power supply circuits 9a, 9b, 9c, and various actuators are connected to the hybrid controller 20. This allows the hybrid controller 20 to control supplying power and regeneration by the front-wheel and rear-wheel motor-generators 4, 7A, 7b.

The frictional brake controller 30 (frictional braking force controller, braking force determiner) is an ECU (ESB-ECU) for controlling the braking device 200. That is, the hybrid controller 20 is connected from various sensors and various actuators of the braking device 200. In particular, the frictional brake controller 30 is connected from the brake pedal stroke sensor 13 for detecting a stepping amount of the brake pedal. This allows the frictional brake controller 30 to control frictional braking by the braking device 200.

The regenerative controller 40 (braking force determiner) is an ECU that executes operation such as outputting to the hybrid control device 20 instructions of regenerative torques by the hybrid controller 20 for regenerative operation of the front-wheel motor-generator 4 closer to the front wheels 2aR, 2aL and the rear-wheel motor-generators 7a, 7b closer to the rear wheels 2bR, 2bL (front-wheel regenerative torque instruction and rear-wheel regenerative torque instruction to be described later).

Such a control system in FIG. 3 is used in the vehicle 10 to cooperatively control between the frictional braking force by the braking device 200 and the regenerative braking force by the front-wheel and rear-wheel motor-generators 4, 7a, 7b.

Note that the hybrid controller 20, the frictional brake controller 30, and the regenerative controller 40 mutually communicate with one another via a Controller Area Network (CAN) of the vehicle 10.

Next, a description will be given of details of the cooperative control achieved by the control system in FIG. 3, with reference to FIG. 4.

Figure 4:
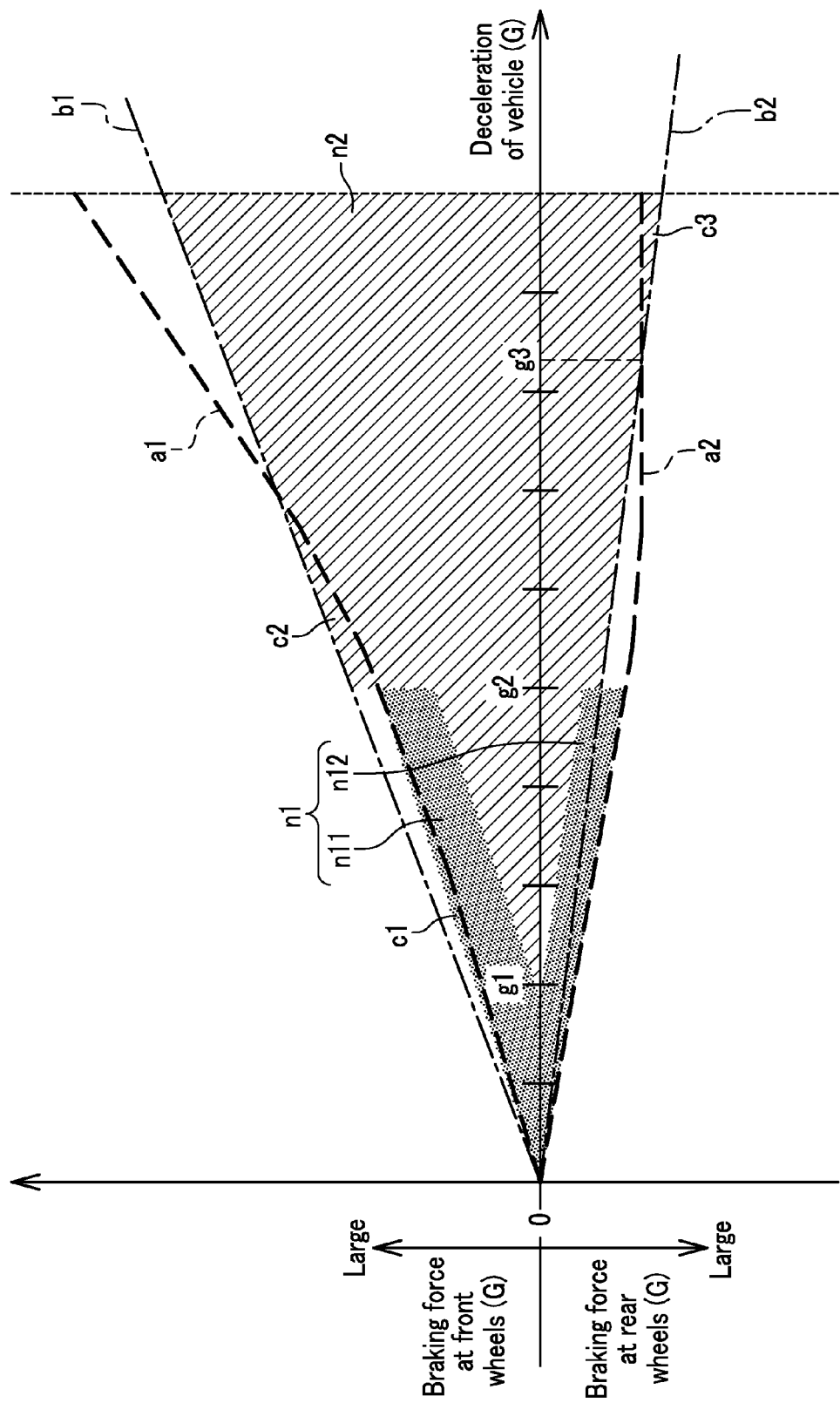
FIG. 4 is a chart illustrating balance of braking forces for cooperative control between a frictional braking force and a regenerative braking force implemented by the braking force control system for a vehicle according to the first embodiment of the present invention.

FIG. 4 is a chart illustrating balance of braking forces for the cooperative control between the frictional braking force and the regenerative braking force. The horizontal axis indicates the variation in deceleration of the vehicle 10 (G). The vertical axis indicates the distributions to a braking force (G) at the front wheels 2aR, 2aL and a braking force (G) at the rear wheels 2bR, 2bL for achieving the deceleration. That is, in the vertical axis, the braking force (G) at the front wheels 2aR, 2aL is indicated above 0 (a larger value as it goes higher), and the braking force at the rear wheels 2bR, 2bL is indicated below 0 (a larger value as it goes lower). The braking forces at the front wheels 2aR, 2aL and rear wheels 2bR, 2bL determine braking torques (a frictional braking torque and a regenerative torque) (unit: Nm) at the front wheels 2aR, 2aL and rear wheels 2bR, 2bL.

First, a setting value (front preset value) a1 for the braking force at the front wheels 2aR, 2aL in association with a magnitude of the deceleration of the vehicle 10 on the horizontal axis (a limit value of the braking force at the front wheels 2aR, 2aL which, if exceeded, will likely cause the front wheels 2aR, 2aL to be locked) is known in advance from the vehicle specification. Also, a value (setting value, or rear preset value) a2 set in advance as a limit value for the braking force at the rear wheels 2bR, 2bL in association with the magnitude of the deceleration of the vehicle 10 (a limit value for the braking force at the rear wheels 2bR, 2bL which, if exceeded, will likely cause the rear wheels 2bR, 2bL to be locked) is known in advance from the vehicle specifications. That is, the setting values a1, a2 are based on the distribution such that neither the front wheels 2aR, 2aL nor the rear wheels 2bR, 2bL are locked (how to determine the ideal braking-force distribution to the rear wheels 2bR, 2bL will be described later). Additionally, the setting value a2 is set to be smaller than the setting value a1. As used herein, the terms "ideal braking force distribution" and "target braking force distribution" may be used interchangeably.

In addition, a distribution ratio [$\alpha$:$\beta$] of the frictional braking force to the front wheels 2aR, 2aL and the rear wheels 2bR, 2bL is also determined in advance from the vehicle specification so that the former is larger than the latter. The ratio is always constant irrespective of the variation in the deceleration of the vehicle 10 on the horizontal axis. Setting values b1, b2 of the frictional braking forces respectively for the front wheels 2aR, 2aL and the rear wheels 2bR, 2bL are those values of the frictional braking forces distributed with the ratio of [$\alpha$:$\beta$] to the front wheels 2aR, 2aL and the rear wheels 2bR, 2bL, if the deceleration of the vehicle 10 is made only by the frictional braking force. The ratio of [$\alpha$:$\beta$] is set so that setting value b2 of the frictional braking force for the rear wheels 2bR, 2bL is smaller than the setting value a2 of the braking force for the rear wheels 2bR, 2bL until the deceleration of the vehicle 10 reaches a value g3 which is at least greater than or equal to a certain value.

The braking force is generated only by the regenerative braking force in a range of the deceleration of the vehicle 10 on the horizontal axis being zero to a predetermined value g1. That is, the total regenerative braking force which gradually increases in the range of zero to g1 (G) is distributed at a predetermined ratio to the front wheels 2aR, 2aL and the rear wheels 2bR, 2bL.

If the deceleration of the vehicle 10 on the horizontal axis exceeds the predetermined value g1, the frictional braking force is generated and gradually increased in size. If the deceleration of the vehicle 10 on the horizontal axis exceeds a predetermined value g2 (>g1), the regenerative braking force is stopped, and after then the braking force is generated only by the frictional braking force. Even if the braking force is generated only by the frictional braking force, the distribution ratio [$\alpha$:$\beta$] of the frictional braking force to the front wheels 2aR, 2aL and the rear wheels 2bR, 2bL remains the same.

The sum of the regenerative braking force and the frictional braking force at the rear wheels 2bR, 2bL is controlled so as not to exceed the setting value a2 of the braking force for the rear wheels 2bR, 2bL, until the deceleration of the vehicle 10 on the horizontal axis reaches the predetermined value g2.

The regenerative braking force and the frictional braking force are distributed to the front wheels 2aR, 2aL and the rear wheels 2bR, 2bL and differently hatched in FIG. 4 as a regenerative braking force n1 (a regenerative braking force n11 for the front wheels 2aR, 2aL and a regenerative braking force n12 for the rear wheel 2bR, 2bL) and a frictional braking force n2. The braking force at the front wheels 2aR, 2aL exceeds the setting value a1 in regions c1, c2. Then, the front wheels 2aR, 2aL may slip in this area. However, the corresponding braking force at the rear wheels 2bR, 2bL is below the setting value a2, and then the rear wheels 2bR, 2bL do not slip.

That is, the frictional braking force, which is driven by the fluid pressure by the braking device 200, has a characteristic of linearly increasing at the ratio [α:β], and is hard to be non-linearly varied.

Adversely, in the example of FIG. 4, the setting value a2 non-linearly varies so as to gradually increase as the deceleration of the vehicle 10 increases and to stagnate around the predetermined value g2 and beyond.

On the other hand, the regenerative braking force is highly controllable as it is generated by the motor-generator, and is easy to be non-linearly varied.

Then, the regenerative braking forces by the rear-wheel motor-generators 7a, 7b for the rear wheels 2bR, 2bL are controlled so that the total braking force for the rear wheels 2bR, 2bL does not exceed the setting value a2 at least until the deceleration of the vehicle reaches a predetermined value g3.

If the deceleration of the vehicle 10 exceeds the value g2 so as to be greater than the value g3, the braking force at the rear wheels 2bR, 2bL exceeds the setting value a2 (region c3). However, in this case, the vehicle behavior stabilizer 218 is actuated to control the frictional braking force so that the rear wheels 2bR, 2bL do not slip, thereby preventing the vehicle 10 from having unstable behavior.

In this way, the frictional braking force is distributed to the front wheels 2aR, 2aL and the rear wheels 2bR, 2bL at a ratio of [α:β]. Additionally, until the deceleration of the vehicle exceeds the predetermined value g3 (>g1, g2), that is, while the deceleration falls between the values g2 and g3, the setting value b2 is maintained so as to be equal to or less than the setting value a2, but the setting value b1 may exceed the setting value a1 (in the regions c1, c2).

This allows a sufficient braking force to be generated at the front wheels 2aR, 2aL, even if the braking force at the rear wheels 2bR, 2bL reaches the setting value a2, and then there will be no shortage of the actual braking force with respect to the total braking force of the vehicle 10 requested by the driver.

In addition, while the accelerator pedal (not shown) is not operated, the vehicle 10 generates a regenerative braking force by the regeneration corresponding to engine braking such as in a conventional gasoline car (accelerator-pedal-OFF regeneration), however the regenerative braking force by the accelerator-pedal-OFF regeneration is not separately shown in FIG. 4 from other regenerative braking force. That is, the accelerator-pedal-OFF regeneration generates a substantially constant regenerative braking force from the deceleration of the vehicle being 0 until reaching the predetermined value g3, except for an initial rising time, both for the front wheels 2aR, 2aL and the rear wheels 2bR, 2bL (however, the value for the front wheels 2aR, 2aL is different from that for the rear wheels 2bR, 2bL). In other words, when the accelerator pedal (not shown) is not operated but the brake pedal 212 is operated, a regenerative braking force, inclusive of that by the accelerator-pedal-OFF regeneration, and the frictional braking force are applied as a braking force (only the regenerative braking force is applied until the predetermined value g1).

Figure 5:
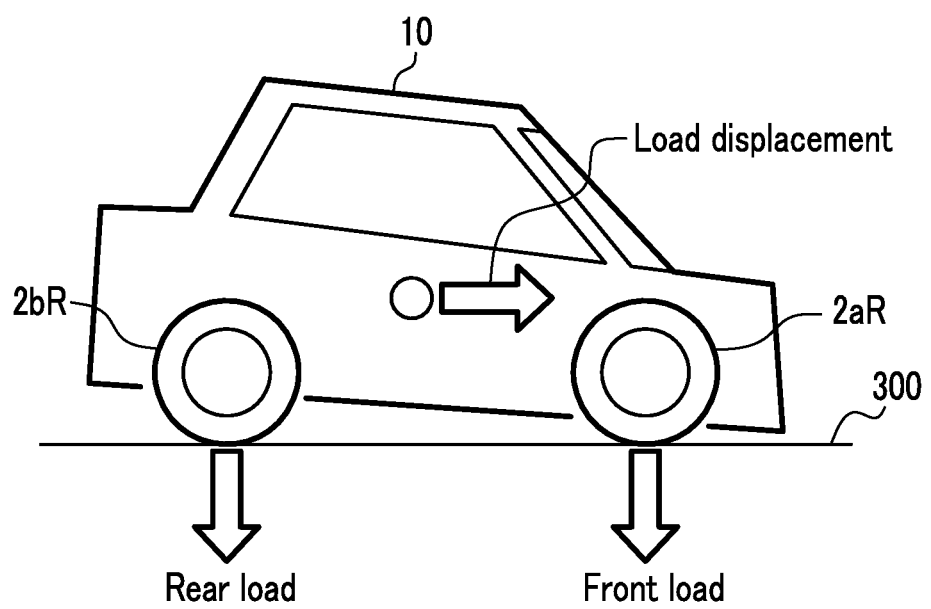
FIG. 5 is a diagram describing a way of calculating a set value a2 in the braking force control system for a vehicle according to the first embodiment of the present invention.

Next, a description will be given of a way of calculating the setting value a2, with reference to FIG. 5. First of all, if the total braking force (braking torque) (Nm), inclusive of both the frictional braking force (frictional braking torque) and the regenerative braking force (regenerative torque), at the front wheels 2aR, 2aL and rear wheels 2bR, 2bL of the vehicle 10 causes the deceleration of the vehicle 10, the vehicle 10 will have a load displacement, as shown in FIG. 5. The load displacement (Nm) is calculated as "load displacement=deceleration×(height of the center of gravity/wheelbase)." Here, the "height of the center of gravity" and the "wheel base" are those of the vehicle 10.

As the load of the vehicle 10 moves toward a front side of the vehicle 10, a load for the rear wheels 2bR, 2bL, or a rear load (a load at the front wheels 2aR, of 2aL is indicated as a "front load"), decreases. The rear load (Nm) in this case is calculated as "rear load={vehicle weight×gravitational acceleration×tire radius×((100−front weight distribution (%))/100)}−load displacement." Here, the "vehicle weight," the "tire radius," and the "front weight distribution" are those of the vehicle 10.

The load of the vehicle 10 decreased as such is multiplied by the road surface μ (the deceleration G) to obtain the ideal braking-force distribution to the rear wheels 2bR, 2bL. That is, it is calculated as "ideal braking-force distribution to rear wheels 2bR, 2bL (Nm)=rear load×road surface μ (deceleration G)."

However, the ideal braking-force distribution is a theoretical value, and it is desirable to set a "margin" by taking variations in a road surface 300, stability of the vehicle 10, and feeling of a passenger into account. That is, the braking torque (Nm) for the rear wheels 2bR, 2bL which corresponds to the setting value a2 (G) is calculated as "braking torque for rear wheels 2bR, 2bL=ideal braking-force distribution to rear wheels 2bR, 2bL×((100−margin (%))/100)." This allows for determining the setting value a2 (G).

Next, a description will be given of specific control for implementing braking control as described with reference to FIGS. 4 and 5.

Back in FIG. 3, the regenerative controller 40 is arranged with a total regeneration limit calculator 31. The hybrid controller 20 transmits "regeneration limit value information (denoted by I1)" to the total regeneration limit calculator 31. That is, it transmits the regeneration limit value information based on the SOC of the battery 8 detected by the battery state detection sensor 11. This allows for perceiving whether the battery 8 is charged to a charge limit value set for the battery 8, or whether there is still some room until the charge limit value is reached, and then the total regeneration limit calculator 31 can use the regeneration limit value information to perceive whether regeneration can be executed, and if it can be executed, how much regeneration is possible. The ratio of the regeneration by the front-wheel motor-generator 4 for the front wheels 2aR, 2aL and the regeneration by the rear-wheel motor-generators 7a, 7b for the rear wheels 2bR, 2bL is determined in advance, for example, by the various parameters of the vehicle, and the regeneration limit value information includes "front-wheel regenerative limit value information" which is regenerative limit value information of the front-wheel motor-generator 4 for the front wheels 2aR, 2aL and "rear-wheel regenerative limit information" which is regeneration limit value information of the rear-wheel motor-generators 7a, 7b for the rear wheels 2bR, 2bL.

In addition, the hybrid controller 20 transmits "accelerator-pedal-OFF torque information" which is a regenerative torque caused by the accelerator-pedal-OFF regeneration generated by the front-wheel and rear-wheel motor-generators 4, 7A, 7b to the total regeneration limit calculator 31 (denoted by I1). The "accelerator-pedal-OFF torque information" includes "total accelerator-pedal-OFF torque information" which is information of the total regenerative torque of the accelerator-pedal-OFF regeneration by the front-wheel motor-generator 4 for the front wheels 2aR, 2aL and the rear-wheel motor-generators 7a, 7b for the rear wheels 2bR, 2bL. Further, the "accelerator-pedal-OFF torque information" also includes "rear wheel accelerator pedal OFF torque information" which is information of a regenerative torque caused by the accelerator-pedal-OFF regeneration generated by the rear-wheel motor-generators 7a, 7b for the rear wheels 2bR, 2bL.

Next, the frictional braking controller 30 outputs "driver-requested braking force information," which indicates amount of operation (braking amount requested by the driver) by the brake pedal stroke sensor 13, to the total regeneration limit calculator 31 of the regenerative controller 40 (denoted by I2).

The total regeneration limit calculator 31 obtains a totally available regenerative torque by the front-wheel motor-generator 4 for the front wheels 2aR, 2aL and the rear-wheel motor-generators 7a, 7b for the rear wheels 2bR, 2bL, based on the regeneration limit value information, the accelerator-pedal-OFF torque information, and the driver-requested braking force information, to transmit the "total regenerable torque information," which indicates the regenerable torque, to the frictional brake controller 30 (denoted by I3).

The frictional braking controller 30 receives the total regenerative torque information from the total regeneration limit calculator 31. Then, the frictional braking controller 30 transmits "total regenerative torque instruction information" to a regenerative torque instruction value calculator 32 of the regenerative control unit 40 (denoted by I4). The total regenerative torque instruction information is information for instructing the front-wheel motor-generator 4 for the front wheels 2aR, 2aL and the rear-wheel motor-generators 7a, 7b for the rear wheels 2bR, 2bL on a regenerative torque (total regenerative torque) to be outputted in total.

Based on the total regenerative torque instruction information, the regenerative torque instruction value calculator 32 transmits "front-wheel regenerative torque instruction information" and "rear-wheel regenerative torque instruction information" to the hybrid controller 20 (denoted by I5). The front-wheel regenerative torque instruction information is information for instructing the hybrid controller 20 on a regenerative torque by the front-wheel motor-generator 4 for the front wheels 2aR, 2aL. The rear-wheel regenerative torque instruction information is information for instructing the hybrid controller 20 on a regenerative torque by the rear-wheel motor-generators 7a, 7b for the rear wheels 2bR, 2bL.

Figure 6:
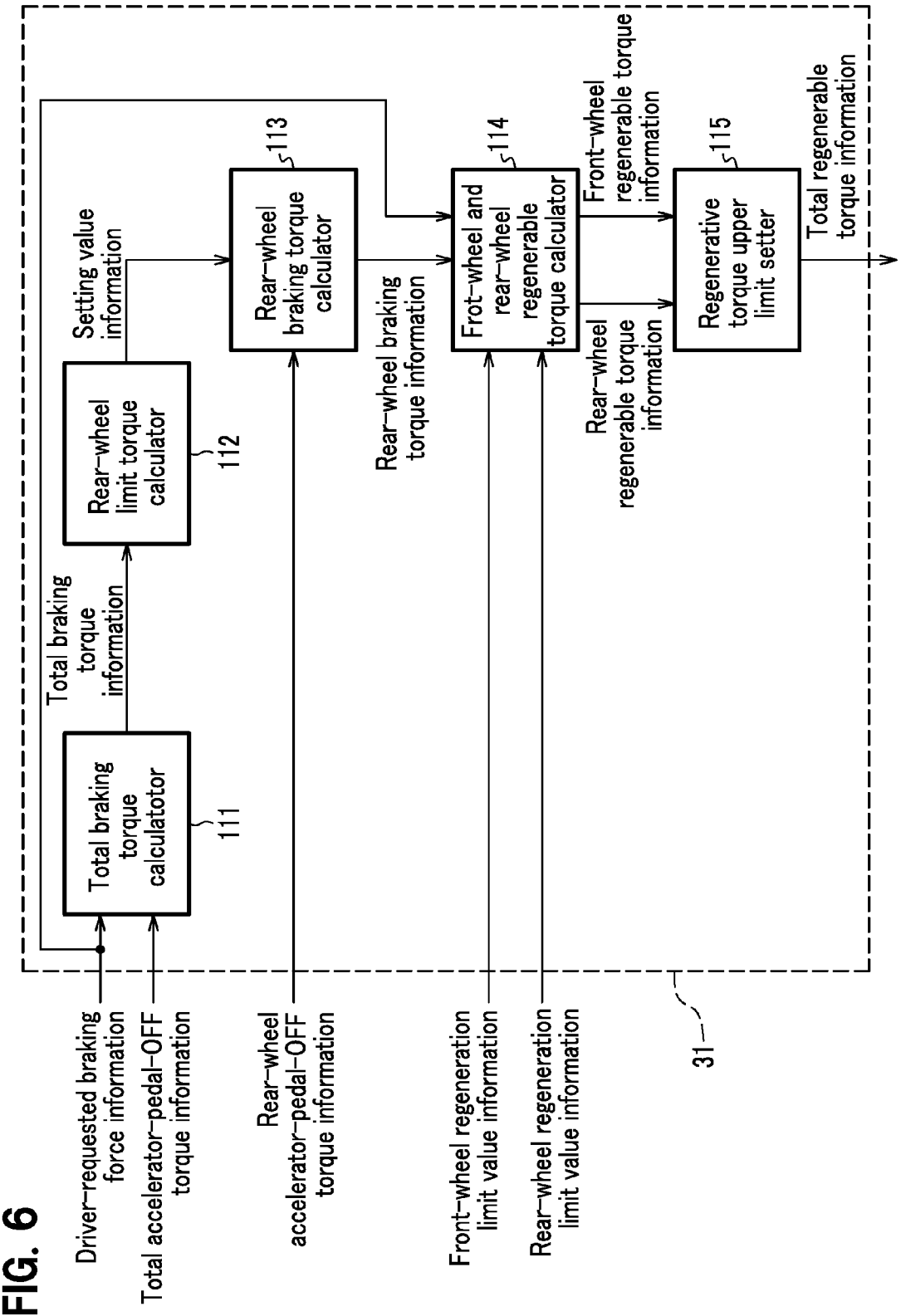
FIG. 6 is a functional block diagram of a total regeneration limit calculator of the braking force control system for a vehicle according to the first embodiment of the present invention.

Next, a description will be given in detail of processing to be executed by the total regeneration limit calculator 31. FIG. 6 is a functional block diagram of the total regeneration limit calculator 31. A total braking torque calculator 111 of the total regeneration limit calculator 31 obtains a total braking torque based on the driver-requested braking force information and the total accelerator-pedal-OFF torque information. The total braking torque is a braking torque obtained by adding a regenerative torque due to the total accelerator-pedal-OFF regeneration to the driver-requested braking torque. That is, the total braking torque is a braking torque to be totally generated in the vehicle 10. The total regeneration limit calculator 31 outputs "total braking torque information," which indicates the total braking torque, to a rear-wheel limit torque calculator 112. The rear-wheel limit torque calculator 112 obtains from the total braking torque information the setting value a2 associated with the total braking torque (deceleration of the vehicle 10 in FIG. 4) indicated by the information, such as with reference to a predetermined control map (or may obtain the value by calculating it according to the procedure described above with reference to FIG. 5). As described above, the setting value a2 is a limit braking torque for the rear wheels 2bR, 2bL to be locked. Note that, as described above, a regenerative torque due to the accelerator-pedal-OFF regeneration generated by the rear-wheel motor-generators 7a, 7b at the rear wheels 2bR, 2bL is not separately shown in FIG. 4 for the setting value a2 from other regenerative torque (collectively shown as the regenerative braking force n1). After obtaining the setting value a2, the rear-wheel limit torque calculator 112 outputs "setting value information," which indicates the setting value a2, to a rear-wheel braking torque calculator 113.

Next, the rear-wheel braking torque calculator 113 subtracts the rear-wheel accelerator-pedal-OFF torque information from the setting value a2 indicated by the setting value a2 information to obtain a braking torque exclusive of the regenerative torque due to the accelerator-pedal-OFF regeneration for the rear wheels 2bR, 2bL (rear-wheel brake torque). Then, "rear-wheel braking torque information," which indicates the rear-wheel braking torque, is transmitted to a front-wheel and rear-wheel regenerable torque calculator 114.

A description will be given of processing executed by the front-wheel and rear-wheel regenerable torque calculator 114, with reference to a flowchart in FIG. 7. First, the rear-wheel braking torque is subtracted from the driver-requested braking force indicated in the driver-requested braking force information, to calculate a braking torque (front-wheel braking torque) for the front wheels 2aR, 2aL (step S1). The front-wheel braking torque is a braking torque obtained by excluding the regenerative torque due to the accelerator-pedal-OFF regeneration for the front wheels 2aR, 2aL from the total braking torque for the front wheels 2aR, 2aL.

Next, a calculation is made for excluding the regenerative torque due to the accelerator-pedal-OFF regeneration for the front wheels 2aR, 2aL from the regenerative torque for the front wheels 2aR, 2aL to obtain a regenerative torque (front-wheel regenerable torque) (step S2). The front-wheel regenerable torque is determined so as to be equal to or less than a regenerative torque as a limit on the basis of the front-wheel regeneration limit value information, and further equal to or less than the front-wheel braking torque.

Next, the front-wheel regenerable torque is subtracted from the front-wheel braking torque to calculate a frictional braking torque at the front wheels 2aR, 2aL (front-wheel frictional braking torque) (step S3).

Next, a frictional braking torque at the rear wheels 2bR, 2bL (rear-wheel frictional braking torque) is calculated (step S4). As described above, the front-wheel and rear-wheel frictional braking torques are set to have the ratio of [α:β], and then the rear-wheel frictional braking torque can be obtained from the front-wheel frictional braking torque calculated in step S3.

At last, a calculation is made for excluding the regenerative torque due to the accelerator-pedal-OFF regeneration for the rear wheels from the regenerative torque for the rear wheels 2bR, 2bL to obtain a regenerative torque (rear-wheel regenerable torque) (step S5). The rear-wheel regenerable torque is set so as to be larger than a value obtained by subtracting the rear-wheel frictional braking torque from the rear-wheel braking torque. However, the rear-wheel regenerable torque is set so as to be equal to or less than a regenerative torque as a limit on the basis of the rear-wheel regeneration limit value information.

Figure 7:
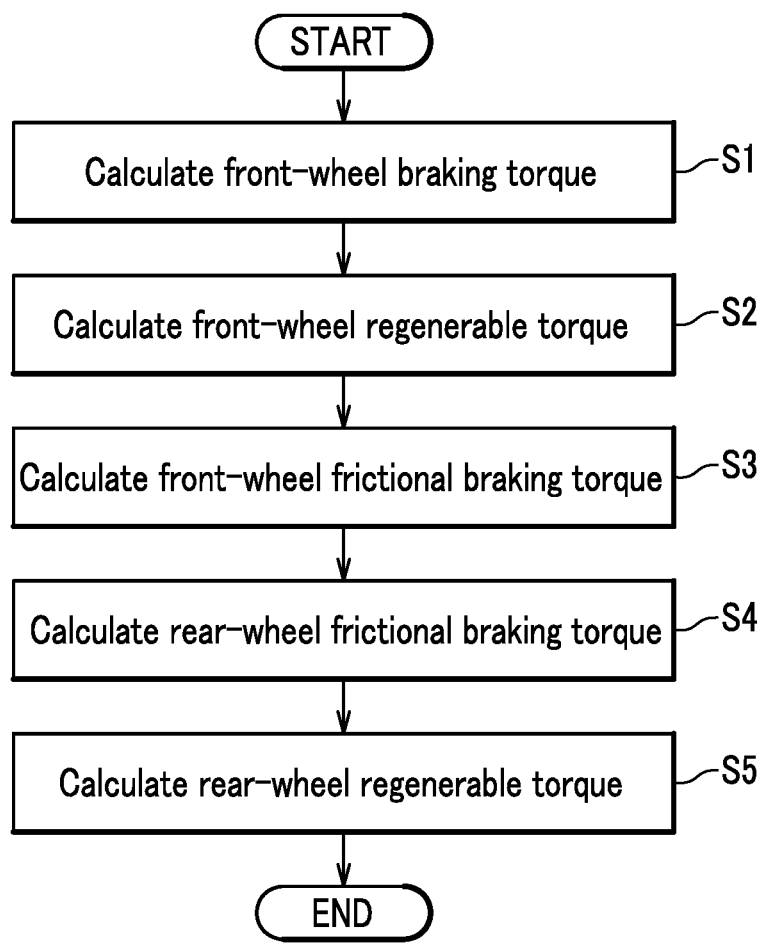
FIG. 7 is a flowchart describing a process executed by a front-wheel and rear-wheel regenerable torque calculator of the braking force control system for a vehicle according to the first embodiment of the present invention.

Through processing in FIG. 7, the front-wheel and rear-wheel regenerable torque calculator 114 obtains the front-wheel and the rear-wheel regenerable torques. "Front-wheel regenerable torque information" and "rear-wheel regenerable torque information," which respectively indicate the front-wheel and rear-wheel regenerable torques obtained as such are transmitted to a regenerative torque upper limit setter 115 (FIG. 6).

Back in FIG. 6, the regenerative torque upper limit setter 115 will be described. The sum of the front-wheel regenerable torque and the rear-wheel regenerable torque indicated by the front-wheel regenerable torque information and the rear-wheel regenerable torque information, respectively, is a current upper limit value for the total regenerative torque by the front-wheel and rear-wheel motor-generators 4, 7a, 7b. However, as shown in FIG. 4, the predetermined value g1 is the upper limit value for the total regenerative torque by the front-wheel and rear-wheel motor-generators 4, 7a, 7b. Then, the regenerative torque upper limit setter 115 obtains a regenerable torque in total (total regenerable torque) by the front-wheel and rear-wheel motor-generators 4, 7a, 7b, which is limited by the predetermined value g1. This value is the predetermined value g1 if the sum of the front-wheel and rear-wheel regenerable torques is equal to or greater than the predetermined value g1, and the sum of the front-wheel and rear-wheel regenerable torques if the sum is less than the predetermined value g1. As described above, "total regenerable torque information," which indicates the total regenerable torque, is transmitted to the frictional braking controller 30 (denoted by I3 in FIG. 3).

As described above with reference to FIG. 3, the frictional braking controller 30 determines a frictional braking torque to be generated by the braking device 200 and a regenerative torque to be generated by the front-wheel and rear-wheel motor-generators 4, 7a, 7b, based on the total regenerable torque information. Then, control is made for the braking device 200 generating such a frictional braking torque, and the total regenerative torque instruction information is transmitted to the regenerative torque instruction value calculator 32 for such a regenerative torque being generated (denoted by I4).

In this case, the frictional braking controller 30 determines a regenerative torque in total (total regenerative torque) to be generated by the front-wheel and rear-wheel motor-generators 4, 7a, 7b so as to have the maximum value within a range of the total regenerable torque indicated by the total regenerable torque information. In this case, if the deceleration of the vehicle 10 shown in the horizontal axis in FIG. 4 is less than or equal to the predetermined value g1, the total regenerative torque is reduced to the same value as the deceleration of the vehicle 10, even if the total regenerable torque is equal to or greater than the predetermined value g1 (no frictional braking torque is generated in this case).

In addition, if the total regenerable torque indicated by the total regenerable torque information is zero (the battery 8 is charged to have a preset limit value), the regeneration is not executed, and then the braking system 200 generates such frictional braking forces so as to be the setting values b1, b2 (FIG. 4). In this case, as it is apparent in FIG. 4, a braking torque for the rear wheels 2bR, 2bL is equal to or less than the setting value a2 for the deceleration of the vehicle 10 not exceeding the value g3.

Further, the frictional braking torque is determined depending on the total regenerative torque indicated by the total regenerative torque instruction information. As described above, the frictional braking torque is distributed to the front wheels 2aR, 2aL and the rear wheels 2bR, 2bL at a ratio of [α:β]. Additionally, the regenerative torques by the front-wheel motor-generator 4 for the front wheels 2aR, 2aL and the rear-wheel motor-generators 7a, 7b for the rear wheels 2bR, 2bL are also distributed at a certain ratio. Then, the frictional braking torque is determined so that a value obtained by adding the regenerative torque for the rear wheels 2bR, 2bL to the frictional braking torque at the rear wheels 2bR, 2bL, according to these distribution ratios, does not exceed the setting value a2 (FIG. 4).

The braking force control system 1 of the present embodiment described above controls so that the total braking torque for the rear wheels 2bR, 2bL does not exceed the setting value a2 (FIG. 4) which is on the basis of the ideal braking force distribution. The setting value a2 is set to be smaller than the setting value a1 (FIG. 4). Additionally, the frictional braking force is distributed to the frictional braking force to be generated for the front wheels 2aR, 2bR and the frictional braking force to be generated for the rear wheels 2aL, 2bL at a ratio of [α:β]. Besides, the regenerative torque is controlled, on the condition that the deceleration of the vehicle 10 is less than or equal to the predetermined value g3, so that the frictional braking force to be generated for the rear wheels 2bR, 2bL, which is distributed according to the distribution ratio of [α:β], is smaller than the setting value a2 which may cause locking at the rear wheels 2bR, 2bL. In addition, a distributed frictional braking force to be generated for the front wheels 2aR, 2aL is made larger than the setting value a1 which causes locking at the front wheels 2aR, 2aL.

According to the braking force control system 1 of the present embodiment, the total braking force for the rear wheels 2bR, 2bL of the frictional and regenerative braking forces is controlled so as not to exceed the setting value a2, to prevent the rear wheels 2bR, 2bL from being locked ahead of the front wheels 2aR, 2aL. Therefore, the vehicle can have stable behavior.

Furthermore, while the frictional braking force can only output linear characteristics as indicated by the setting values b1, b2 in FIG. 4, the regenerative braking force for the rear wheels 2bR, 2bL can be regulated by the rear-wheel motor-generators 7a, 7b, which have high controllability, to easily control so that the total braking force for the rear wheels 2bR, 2bL does not exceed the setting value a2.

Note that an example of a four-wheel drive vehicle has been shown in the above embodiment, where the front wheels 2aR, 2aL are driven by the engine 3 and the front-wheel motor-generator 4, while the rear wheels 2bR, 2bL are driven by the rear-wheel motor-generators 7a, 7b, however the present invention is not limited thereto and may be applied to a four-wheel drive electric vehicle, where four wheels are all driven by motor-generators.

Second Embodiment

Figure 8:
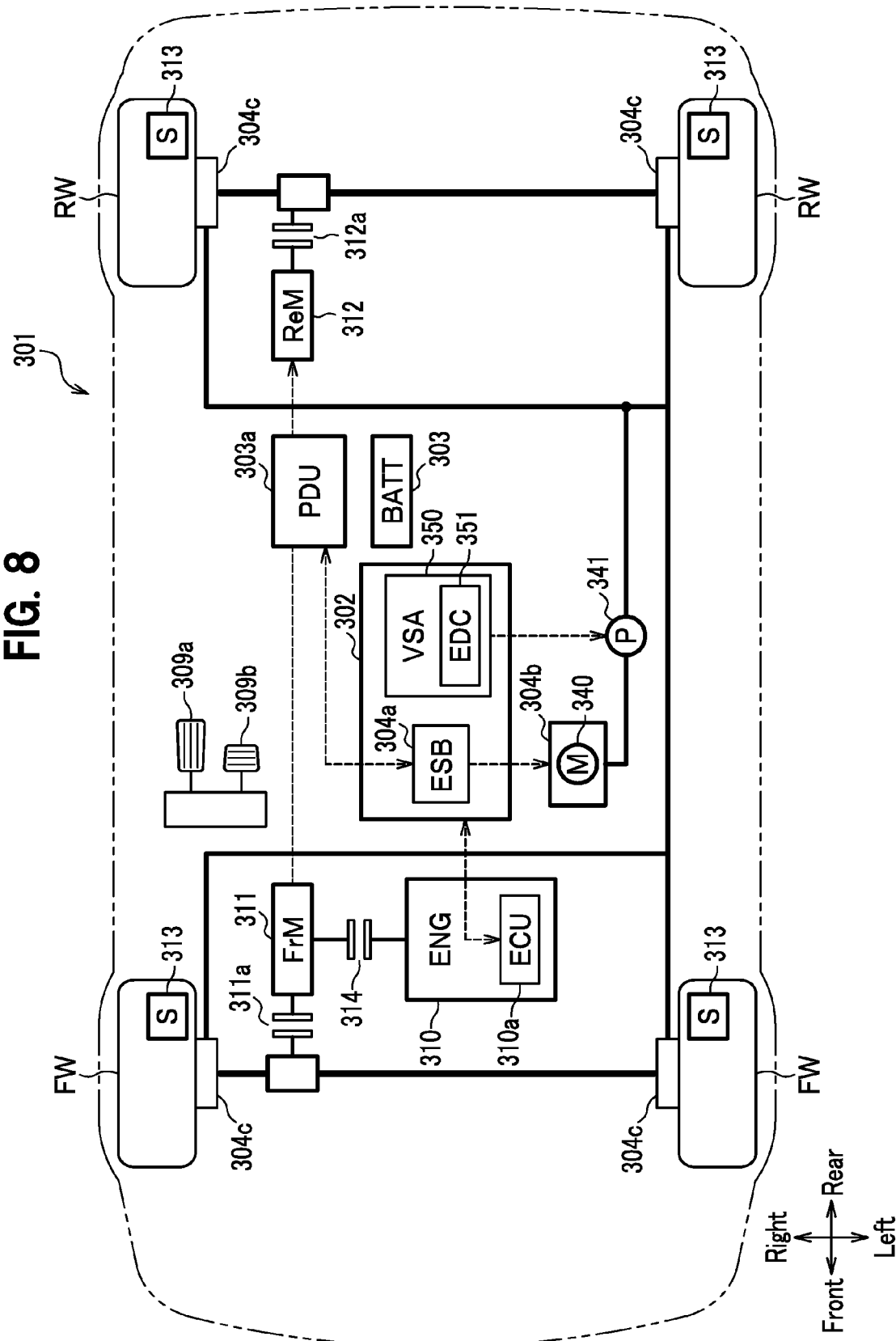
FIG. 8 is a schematic diagram of a configuration of a vehicle including a braking force control system according to a second embodiment of the present invention.

FIG. 8 is a schematic diagram of a configuration of a vehicle including a braking force control system of the present embodiment.

As shown in FIG. 8, a vehicle 301 of the present embodiment is a four-wheel drive vehicle having two front wheels FW and two rear wheels RW. The vehicle 301 is assumed to have a front on a side where the front wheels FW are provided and a rear on a side where the rear wheels RW are provided. In addition, a right and a left are set for the vehicle 301 as viewed from the rear.

The front wheels FW are driven by driving forces generated by an engine 310 and a front-wheel motor-generator 311 (second motor-generator). The front wheels FW are configured to have a hybrid drive by the driving forces of the engine 310 and the front-wheel motor-generator 311. The rear wheels RW are driven by a driving force generated by a rear-wheel motor-generator 312 (first motor-generator). The engine 310 is controlled by an engine ECU 310a (braking force determiner etc.). The front-wheel motor-generator 311 and the rear-wheel motor-generator 312 are supplied with drive power from a battery 303. The front-wheels FW and rear-wheels RW include wheel speed sensors 313 for detecting wheel speeds.

A front wheel clutch 311a is arranged between the front-wheel motor-generator 311 and the front wheel FW. Once the front wheel clutch 311a is engaged, the front-wheel motor-generator 311 is connected with the front wheel FW to transmit a driving force generated by the front-wheel motor-generator 311 to the front wheels FW. Once the front wheel clutch 311a is disengaged, the front-wheel motor-generator 311 is disconnected from the front wheels FW.

In addition, a rear wheel clutch 312a is arranged between the rear-wheel motor-generator 312 and the rear wheels RW. Once the rear wheel clutch 312a is engaged, the rear-wheel motor-generator 312 is connected with the rear wheels RW to transmit a driving force generated by the rear-wheel motor-generator 312 to the rear wheels RW. Once the rear wheel clutch 312a is disengaged, the rear-wheel motor-generator 312 is disconnected from the rear wheels RW.

Note that two rear-wheel motor-generators 312 may be included so as to respectively drive two rear wheels RW.

The front wheel clutch 311a and the rear wheel clutch 312a are controlled by a control device 302 which is included in the vehicle 301.

The front-wheel motor-generator 311 and the rear-wheel motor-generator 312 are driven and controlled by a Power Drive Unit (PDU) 303a (regenerative braking force controller etc.). The PDU 303a is configured so as to be capable of switching the front-wheel motor-generator 311 and the rear-wheel motor-generator 312 into a regenerative mode. This allows for applying regenerative braking torques RGtrq, which are generated through regeneration control of the front-wheel motor-generator 311 and the rear-wheel motor-generator 312, to the wheels. Then, the regenerative braking torques RGtrq are applied to the wheels for the vehicle 301 to have a regenerative braking force.

The vehicle 301 includes the control device 302 (braking force determiner etc.). The control device 302 controls the front-wheel motor-generator 311 and the rear-wheel motor-generator 312 via the PDU 303a to suitably apply drive torques to the front wheels FW and the rear wheels RW. In addition, the control device 302 is connected with the engine ECU 310a for data communication.

A clutch mechanism (driving-force switching clutch 314) is arranged between the engine 310 and the front-wheel motor-generator 311. Once the driving-force switching clutch 314 is engaged, a driving force generated by the engine 310 is transmitted to the front wheels FW via the front-wheel motor-generator 311. Also, once the driving-force switching clutch 314 is disengaged, the transmission of the driving force generated by the engine 310 to the front wheels FW is disrupted. The driving-force switching clutch 314 is controlled by the control device 302.

The vehicle 301 of the present embodiment is configured so as to be switched, as a travel mode for traveling by a driving force outputted from the front-wheel motor-generator 311 and the rear-wheel motor-generator 312, between a rear-wheel EV traveling, a front-wheel EV traveling, and a four-wheel EV traveling.

Figure 9A:
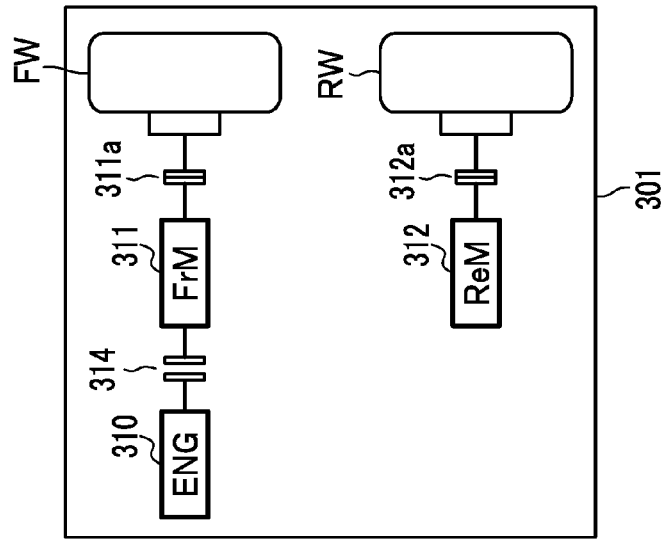
FIGS. 9A to 9C are schematic diagrams showing traveling modes of a vehicle traveling with one or more motor-generators, according to the second embodiment of the present invention, where
Figure 9B:
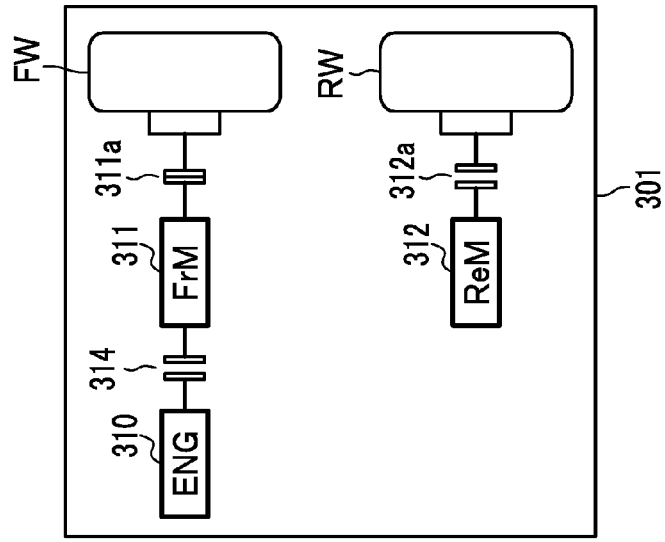
Figure 9C:
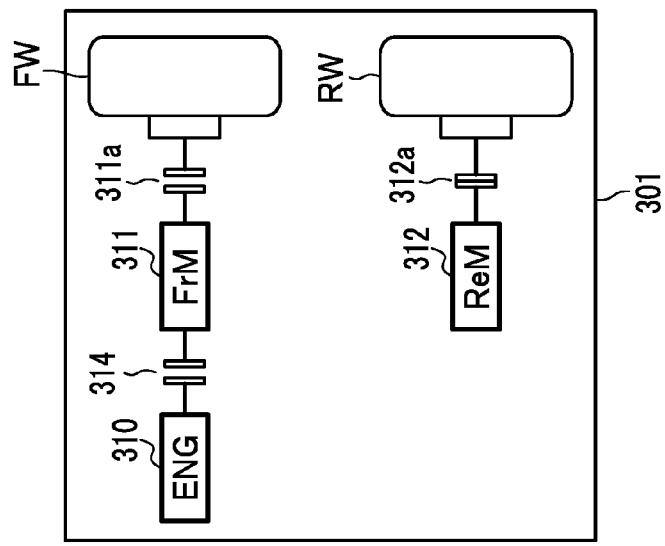

FIGS. 9A to 9C are schematic diagrams showing traveling modes of a vehicle traveling with one or more motor-generators, where FIG. 9A shows the rear-wheel EV traveling, FIG. 9B shows the front-wheel EV traveling, and FIG. 9C shows the four-wheel EV traveling.

Note that FIG. 9 schematically illustrates the front wheels FW and the rear wheels RW with only one member for each group, for sake of simplicity. For this reason, the layout of FIG. 9 is slightly different from the layout of FIG. 8.

In the rear-wheel EV traveling, as shown in FIG. 9A, the rear-wheel clutch 312a is engaged and the front-wheel clutch 311a is disengaged. In this state, a driving force outputted from the rear-wheel motor-generator 312 is transmitted to the rear wheels RW to apply driving torques to the rear wheels RW. The vehicle 301 travels with only the rear wheels RW being driven by the driving force from the rear-wheel motor-generator 312.

In the front-wheel EV traveling, as shown in FIG. 9B, the front wheel clutch 311a is engaged and the rear wheel clutch 312a is disengaged. In addition, the driving-force switching clutch 314 is disengaged. In this state, a driving force outputted from the front-wheel motor-generator 311 is transmitted to the front wheels FW to apply driving torques to the front wheels FW. The vehicle 301 travels with only the front wheels FW being driven by the driving force from the front-wheel motor-generator 311.

In the four-wheel EV traveling, as shown in FIG. 9C, the front wheel clutch 311a and the rear wheel clutch 312a are both engaged. In addition, the driving-force switching clutch 314 is disengaged. In this state, a driving force outputted from the front-wheel motor-generator 311 is transmitted to the front wheels FW to apply driving torques to the front wheels FW. Also, a driving force outputted from the rear-wheel motor-generator 312 is transmitted to the rear wheels RW to apply driving torques to the rear wheels RW. The vehicle 301 travels with the front wheels FW being driven by the driving force from the front-wheel motor-generator 311 and the rear wheels RW being driven by the driving force from the rear-wheel motor generator 312.

Additionally, the vehicle 301 is configured so as to be capable of traveling with the front wheels FW being driven by a driving force generated by the engine 310. In this case, the front wheel clutch 311a and the driving-force switching clutch 314 are engaged.

Now, a description of FIG. 8 will be resumed. The vehicle 301 includes an Electric Servo Brake (ESB), which is a so-called by-wire brake for generating a braking force (the by-wire brake is configured as with that in the first embodiment described above, and then a detailed description thereof will be omitted; the same holds true for a vehicle behavior stabilizer to be described later). The electric servo brake includes an ESB controller 304a, a fluid pressure generator 304b, and a braking device 304c such as a disk brake. The fluid pressure generator 304b is configured, for example, such that an actuator 340 is driven to move a piston for generating a fluid pressure. The braking device 304c is operated by the fluid pressure generated by the fluid pressure generator 304b, to apply frictional braking torques FRtrq to the front wheels FW and the rear wheels RW. Then, having the wheels applied with the frictional braking torques FRtrq causes the vehicle 301 to have a frictional braking force.

Note that the fluid pressure generator 304b is configured so as to supply fluid pressures to the braking devices 304c for the front wheels FW and the braking devices 304c for the rear wheels FW, respectively.

The electric servo brake (the ESB controller 304a, the fluid pressure generator 304b, and the braking device 304c) applies the frictional braking torques FRtrq to the front wheel FW and the rear wheels RW, for the vehicle 301 to generate a frictional braking force. The ESB controller 304a may be incorporated in the control device 302. Note that a hydraulic system for supplying a hydraulic pressure to the braking device 304c is simplified in FIG. 8. Then, such as dual system components for fail-safe operation are not shown.

In addition, the vehicle 301 includes a VSA (registered trademark) controller 350 for controlling the vehicle behavior stabilizer of the electric servo brake. The VSA controller 350 may be incorporated in the control device 302. The VSA controller 350 controls a VSA pump 341 to regulate the fluid pressure to be supplied to the braking device 304c for executing antilock braking control (ABS control). In other words, the VSA controller 350 functions as an ABS controller for executing the antilock braking control. The VSA controller 350, the VSA pump 341, and the braking devices 304c constitute a VSA in the present embodiment.

The VSA controller 350 includes an EDC controller 351 that executes engine drag control (EDC) of reducing an AP-OFF braking force, to be described later, if the wheels RW, FW slip. When an accelerator pedal 309a has been released or in accordance with road surface conditions and/or the wheels slipping (when the driver has stopped stepping the accelerator pedal 309a), the EDC controller 351 of the present embodiment reduces a regenerative braking torque corresponding to an engine brake (AP-OFF braking force) or a regenerative braking torque RGtrq, which is applied to the wheels when the driver has stepped a brake pedal 309b. The engine ECU 310a, the control device 302, or the like calculates the AP-OFF braking force, such as based on a vehicle speed. Then, the control device 302 or the like controls so that the calculated AP-OFF braking force is generated in the vehicle 301.

For making the vehicle 301 generate the AP-OFF braking force, the control device 302 or the like calculates the regenerative braking torque RGtrq (AP regenerative torque APtrq) to be applied to the front wheels FW and the rear wheels RW. The control device 302 or the like controls the PDU 303a to switch the front-wheel motor-generator 311 and the rear-wheel motor-generator 312 into the regenerative mode for regeneration control of the front-wheel motor-generator 311 and the rear-wheel motor-generator 312. The front-wheel motor-generator 311 and the rear-wheel motor-generator 312 apply the AP regenerative torques APtrq to the wheels.

In the present embodiment, the engine ECU 310a, the control device 302, and the PDU 303a, for example, constitute a braking force control system.

In the vehicle 301 having the braking force control system configured as such, once the accelerator pedal 309a is stepped by the driver, the control device 302 or the like calculates driving torques to be applied to the front wheels FW and the rear wheels RW, based on traveling conditions of the vehicle 301 (vehicle body speed, requested driving force).

The requested driving force is a driving force of the vehicle 301 requested by the driver. The control device 302 calculates the requested driving force based on such as a stepping amount of the accelerator pedal 309a. In addition, the control device 302 calculates driving torques to be applied to the wheels for the vehicle 301 to generate the requested driving force. Note that the reference numeral 309b in FIG. 8 is for the brake pedal.

The control device 302 calculates the vehicle body speed of the vehicle 301 based on detection signals (wheel speed signals) inputted from the wheel speed sensors 313. The wheel speed signal is, for example, a pulse wave composed of a certain number of pulses that are generated every time the front wheel FW or the rear wheel RW rotates one revolution. Then, the control device 302 controls the front-wheel motor-generator 311 and the rear-wheel motor-generator 312 via the PDU 303a, for the front-wheel motor-generator 311 and the rear-wheel motor-generator 312 to generate the calculated driving torque. Note that the control device 302 or the like utilizes known techniques in the present embodiment for calculating the requested driving force and/or the driving torque.

Figure 10:
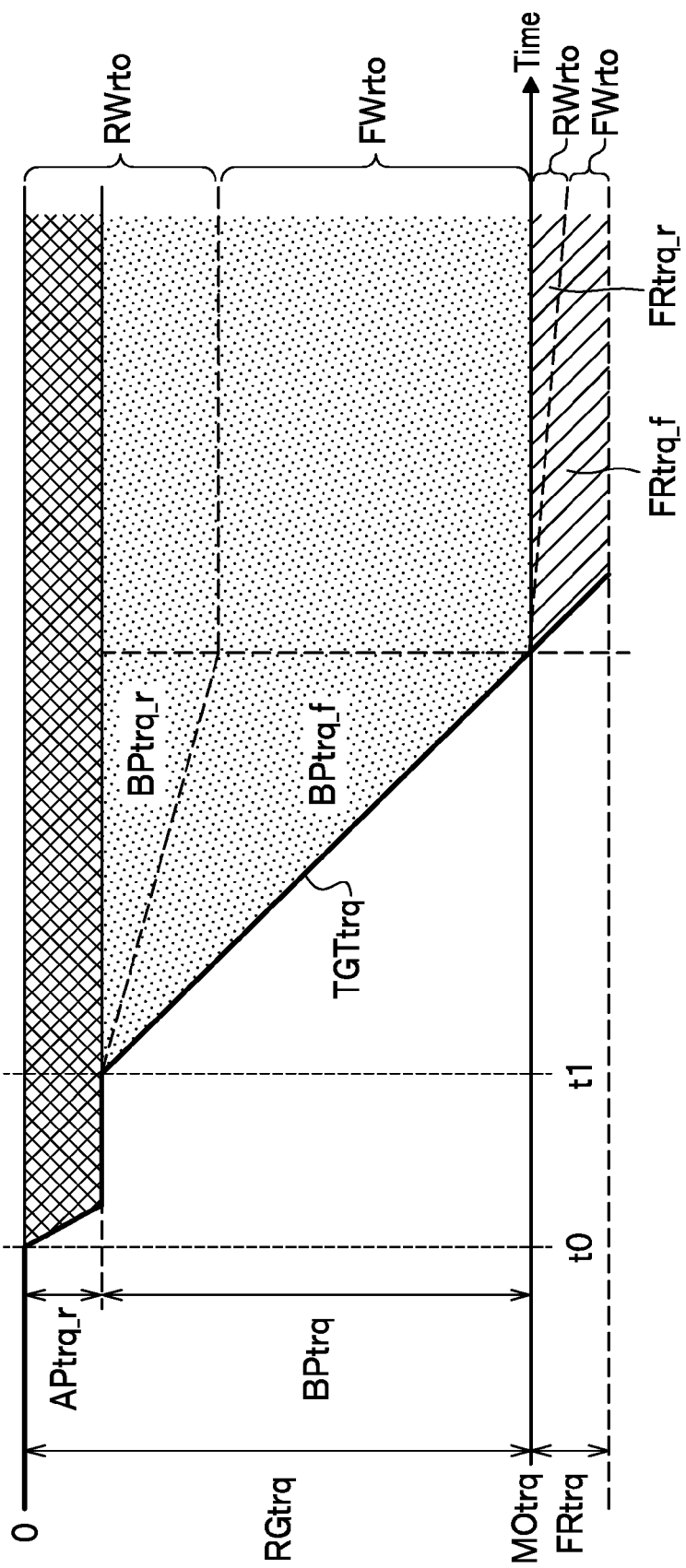
FIG. 10 is a chart indicating a target braking torque, and regenerative and frictional braking torques while traveling in the rear-wheel EV mode in the second embodiment of the present invention.
Figure 11:
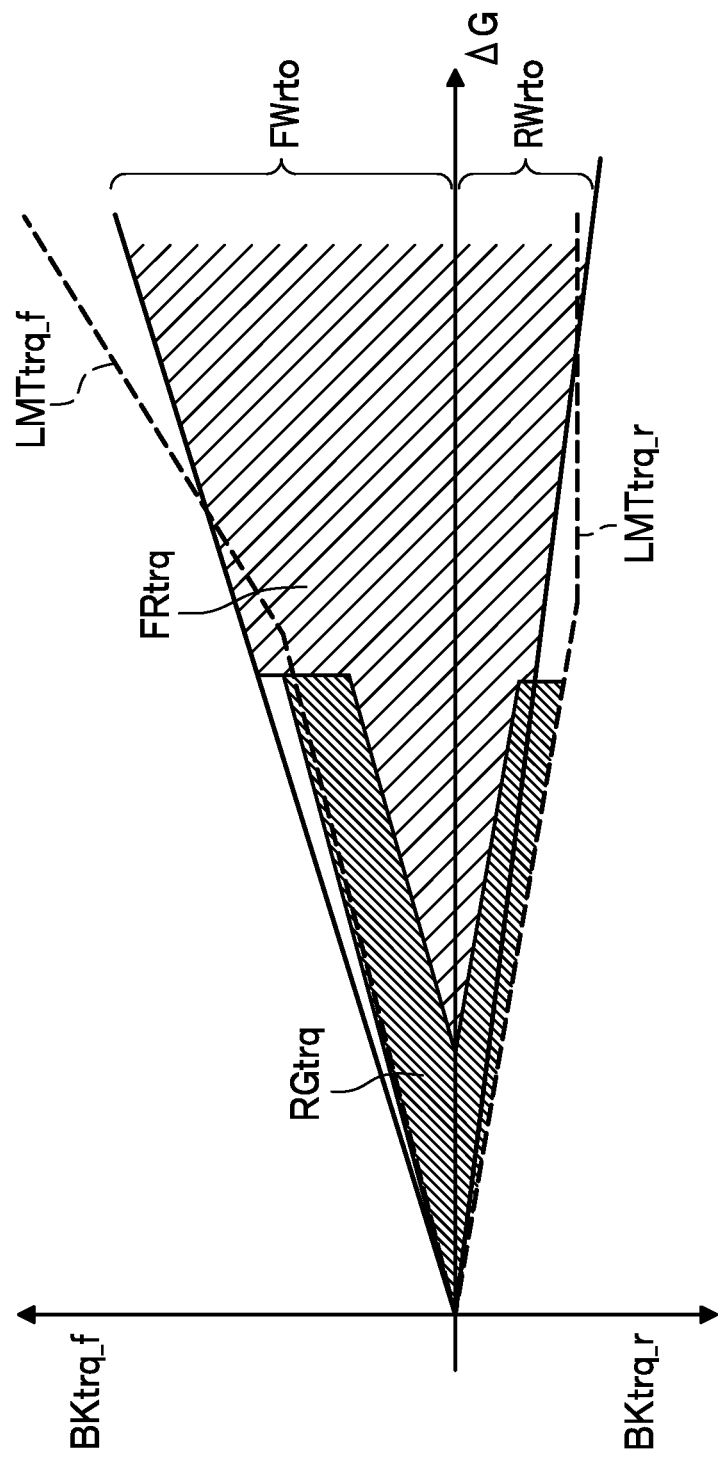
FIG. 11 is a chart indicating a limit braking torque in accordance with the deceleration in the second embodiment of the present invention.

FIG. 10 is a chart indicating the target braking torque, and the regenerative and frictional braking torques while traveling in the rear-wheel EV traveling mode. In addition, FIG. 11 is a chart indicating a limit braking torque in accordance with the deceleration.

In FIG. 10, the torque is zero at a top end and increases as it goes downward.

Once the brake pedal 309b is stepped by the driver, the ESB controller 304a calculates the requested braking force requested by the driver.

The ESB controller 304a calculates the requested braking force based on such as the stepped amount of the brake pedal 309b. In addition, the engine ECU 310a, the control device 302, or the like calculates, for the vehicle 301 to generate the requested braking force, a target value of the braking torque (target braking torque TGTtrq) to be applied to the wheels (front wheels FW and rear wheels RW).

As shown in FIG. 10, on the condition that the vehicle 301 (see FIG. 8) travels in the rear-wheel EV traveling mode, once the accelerator pedal 309a is released at time t0, the control device 302 (see FIG. 8) switches the rear-wheel motor-generator 312 (see FIG. 8) into the regenerative mode for regenerative control of the rear-wheel motor-generator 312. The rear-wheel motor-generator 312 applies the AP regenerative torque APtrq to the rear wheels RW (see FIG. 8). The AP regenerative torque APtrq to be applied to the rear wheels RW is referred to as a rear-wheel AP regenerative torque APtrq_r.

In addition, once the brake pedal 309b (see FIG. 8) is stepped at time t1, the ESB controller 304a (see FIG. 8) calculates the requested braking force in accordance with the stepping amount of the brake pedal 309b. Further, the engine ECU 310a, the control device 302, or the like calculates the target braking torque TGTtrq for the vehicle 301 (see FIG. 8) to generate the requested braking force and the AP-OFF braking force. Furthermore, the engine ECU 310a, the control device 302, or the like of the present embodiment distributes the calculated target braking torque TGTtrq so as to be applied to the front wheels FW and the rear wheels RW at the predetermined ratio.

Then, the engine ECU 310a, the control device 302 or the like calculates a braking torque to be applied to the front wheels FW (front-wheel BP regenerative torque BPtrq_f) in accordance with the stepping amount of the brake pedal 309b and a braking torque to be applied to the rear wheels RW (rear-wheel BP regenerative torque BPtrq_r) in accordance with the stepping amount of the brake pedal 309b.

When the braking force has been applied to the vehicle 301 in FIG. 8 to decelerate the vehicle 301, a load applied to the front wheels FW is larger than a load applied to the rear wheels RW. Accordingly, the engine ECU 310a, the control device 302, or the like distributes the target braking torque TGTtrq in a suitable ratio (braking force distribution ratio) so that a braking torque to be applied to the front wheels FW (front-wheel BP regenerative torque BPtrq_f) is larger than a braking torque to be applied to the rear wheels RW (rear-wheel AP regenerative torque APtrq_r+rear-wheel BP regenerative torque BPtrq_r). That is, the engine ECU 310a, the control device 302, or the like sets a braking-force distribution ratio for the braking torque to be applied to the front wheels FW and the braking torque to be applied to the rear wheels RW to be [FWrto:RWrto]. The braking-force distribution ratio is a value which is suitably set on the basis of the case where the braking force is applied to the vehicle 301 only with the frictional braking force, or a value which is suitably set as a design value for the vehicle 301 having no regenerative braking force generated, so as to have a ratio of the braking torque to be applied to the front wheels FW being larger than the braking torque to be applied to the rear wheels RW (i.e., FWrto>RWrto). As an example, [FWrto:RWrto] is set to [7:3].

As shown in FIG. 11, the vehicle 301 (see FIG. 8) is decelerated in braking at the deceleration (ΔG) in accordance with the braking force being generated. Then, a limit braking torque LMTtrq in accordance with the deceleration ΔG is set for the front wheels FW (see FIG. 8) and the rear wheels RW (see FIG. 8). The limit braking torque LMTtrq is a braking torque of the limit where respective wheels will not lock, and a limit braking torque for the front wheels FW (front-wheel limit braking torque LMTtrq_f) and a limit braking torque for the rear wheels RW (rear-wheel limit braking torque LMTtrq_r) are respectively set.

FIG. 11 indicates that a front-wheel braking torque BKtrq_f in accordance with the requested deceleration ΔG is applied to the front wheels FW (see FIG. 8), and a rear-wheel braking torque BKtrq_r in accordance with the requested deceleration ΔG is applied to the rear wheels RW (see FIG. 8). In addition, FIG. 11 indicates that only the regenerative braking torque RGtrq is applied to the front wheels FW and the rear wheels RW in a range where the requested deceleration ΔG is small (i.e., requested braking force is small), while the regenerative braking torque RGtrq and the frictional braking torque FRtrq by friction are applied to the front wheels FW and the rear wheels RW as the requested deceleration ΔG increases (that is, the requested braking force increases). On the condition that the vehicle 301 travels in the rear-wheel EV mode, the regenerative braking torque RGtrq includes the rear-wheel AP regenerative torque APtrq_r, and a BP regenerative torque BPtrq which is a regenerative torque in accordance with the amount of operation of the brake pedal 309b (see FIG. 8). The BP regenerative torque BPtrq will be described later.

Note that the front-wheel braking torque BKtrq_f is a braking torque to be applied to the front wheels FW, while the rear-wheel braking torque BKtrq_r is a braking torque to be applied to the rear wheels RW.

In addition, the front-wheel braking torque BKtrq_f applied to the front wheels FW exceeding the front-wheel limit braking torque LMTtrq_f indicates that the front wheels FW will be locked. Also, the rear-wheel braking torque BKtrq_r applied to the rear wheels RW exceeding the rear-wheel limit braking torque LMTtrq_r indicates that the rear wheels RW will be locked.

Note that the front-wheel limit braking torque LMTtrq_f and the rear-wheel limit braking torque LMTtrq_r may be set lower than the limit of the wheels being actually locked, by taking stability of the vehicle 301 and various road surface conditions into account.

As described above, for the vehicle 301 (see FIG. 8) in braking, a load applied to the front wheels FW is larger than that to the rear wheels RW. That is, the frictional force generated between the front wheels FW and the road surface is greater than the frictional force generated between the rear wheels RW and the road surface. Therefore, a limit braking torque for the front wheels FW (front-wheel limit braking torque LMTtrq_f) is larger than a limit braking torque for the rear wheels FW (rear-wheel limit braking torque LMTtrq_r).

In addition, the braking-force distribution ratio [FWrto:RWrto] is set on the basis of the front-wheel limit braking torque LMTtrq_f and the rear-wheel limit braking torque LMTtrq_r.

For example, on the condition that the regenerative braking force and the frictional braking force are distributed to the front wheels FW (see FIG. 8) and the rear wheels RW (see FIG. 8), the regenerative braking torque RGtrq and the frictional braking torque FRtrq are distributed and applied to the front wheels FW and the rear wheels RW. At this time, such a distribution ratio of the regenerative braking torque RGtrq and frictional braking torque FRtrq to be distributed so that the sum of the regenerative braking torque (rear-wheel regenerative braking torque RGtrq_r) and the frictional braking torque (rear-wheel frictional braking torque FRtrq_r), which are distributed to the rear wheels RW, does not exceed the rear-wheel limit braking torque LMTtrq_r may be set as the braking-force distribution ratio. The rear-wheel frictional braking torque FRtrq_r is a frictional braking torque FRtrq to be distributed and applied to the rear wheels RW. That is, the frictional braking force and the regenerative braking force, which contains a braking force equivalent to an engine brake (AP-OFF braking force), are determined by the engine ECU 310a, the control device 302, or the like so that the total braking force to be applied to the rear wheels FW does not exceed the rear-wheel limit braking torque LMTtrq_r set in advance.

Such a braking-force distribution ratio is preferably set in advance as a characteristic value of the vehicle 301, through experimental measurements and/or simulations.

Alternatively, the ideal distribution ratio of the frictional braking force in the vehicle 301 (see FIG. 8) may be set as the braking-force distribution ratio. The ideal distribution ratio of the frictional braking force is a distribution ratio for distributing the frictional braking torque FRtrq so that the frictional braking torque FRtrq, after being distributed and applied to the front wheels FW and the rear wheels RW, generates the maximum braking force.

Now, a description of FIG. 10 will be resumed. For calculating the target braking torque TGTtrq, the engine ECU 310a, the control device 302 (see FIG. 8), or the like calculates a generable regenerative torque MOtrq which can be applied to the wheels through the regenerative control of the front-wheel motor-generator 311 and the rear-wheel motor-generator 312 shown in FIG. 8. The generable regenerative torque MOtrq is a regenerative braking torque RGtrq which can be generated through regenerative control of the front-wheel and rear-wheel motor-generators 311, 312. In other words, the regenerative braking torque RGtrq to be applied is set between zero and the generable regenerative torque MOtrq. The engine ECU 310a, the control device 302, or the like calculates the generable regenerative torque MOtrq on the basis of a state of charge of the battery 303 (see FIG. 8), and/or states of the front-wheel and rear-wheel motor-generators 311, 312 generating outputs and heat. The state of charge of the battery 303 is notified to the ESB controller 304a via the PDU 303a (see FIG. 8).

In addition, the front-wheel motor-generator 311 and the rear-wheel motor-generator 312 may be configured to include temperature detectors (not shown) so as to notify the control device 302 or the like of the states of the front-wheel motor-generator 311 and the rear-wheel motor-generator 312 generating heat.

On the condition that the brake pedal 309b (see FIG. 8) is stepped at time t1 shown in FIG. 10, if the generable regenerative torque MOtrq is not zero (the regenerative braking torque RGtrq can be generated) and the vehicle 301 is traveling in the rear-wheel EV traveling mode, the engine ECU 310a, the control device 302, or the like in FIG. 8 switches the rear-wheel motor-generator 312 via the PDU 303a (see FIG. 8) into the regenerative mode.

Then, the engine ECU 310a, the control device 302, or the like applies the AP regenerative torque APtrq (rear-wheel AP regenerative torque APtrq_r) to the rear wheels RW through regenerative control of the rear-wheel motor-generator 312.

In addition, the engine ECU 310a, the control device 302, or the like in FIG. 8 calculates a remainder of the calculated generable regenerative torque MOtrq, which is not to be consumed as the rear-wheel AP regenerative torque APtrq_r, as the regenerative braking torque RGtrq (BP regenerative torque BPtrq) in accordance with the amount of operation of the brake pedal 309b (see FIG. 8). Then, the control device 302 or the like controls the PDU 303a for regenerative control of the front-wheel motor-generator 311 and the rear-wheel motor-generator 312. The front-wheel motor-generator 311 and the rear-wheel motor-generator 312 apply the regenerative braking torque RGtrq calculated by the engine ECU 310a, the control device 302, or the like to the front wheels FW and the rear wheels RW.

The sum of the rear-wheel AP regenerative torque APtrq_r to be applied to the rear wheels RW and the BP regenerative torque BPtrq to be applied to the front wheels FW and the rear wheels RW is the regenerative braking torque RGtrq to be applied to the wheels of the vehicle 301.

Note that, if the brake pedal 309b has been stepped, the control device 302 controls the PDU 303a to switch the front-wheel motor-generator 311 into the regenerative mode so that the BP regenerative torque BPtrq is applied to the front wheels FW.

The engine ECU 310a, the control device 302, or the like distributes the BP regenerative torque BPtrq to the front wheels FW and the rear wheels RW so that the BP regenerative torque BPtrq to be applied to the front wheels FW (front-wheel BP regenerative torque BPtrq_f) and the BP regenerative torque BPtrq to be applied to the rear wheels RW (rear-wheel BP regenerative torque BPtrq_r) have a ratio of the braking-force distribution ratio.

If the regenerative braking torque RGtrq to be applied to the wheels through regenerative control of the front-wheel and rear-wheel motor-generators 311, 312 is not enough for the target braking torque TGTtrq, the control device 302 or the like controls the fluid pressure generator 304b to supply fluid pressure to the braking device 304c. This causes a braking torque by friction (frictional braking torque FRtrq) to be applied to the front wheels FW and the rear wheels RW. The engine ECU 310a, the control device 302, or the like distributes and apply the frictional braking torque FRtrq to the front wheels FW and rear wheels RW at the braking-force distribution ratio. The frictional braking torque FRtrq to be distributed to the front wheels FW is referred to as a front-wheel frictional braking torque FRtrq_f. That is, the front-wheel frictional braking torque FRtrq_f is applied to the front wheels FW, and a rear-wheel frictional braking torque FRtrq_r is applied to the rear wheels RW. The front-wheel frictional braking torque FRtrq_f and the rear-wheel frictional braking torque FRtrq_r have a ratio of the braking-force distribution ratio.

As described above, on the condition that the accelerator pedal 309a (see FIG. 8) is released and the brake pedal 309b (see FIG. 8) is stepped, the control device 302 (ESB controller 304a) or the like controls the fluid pressure generator 304b to apply the frictional braking torque FRtrq to the front wheels FW and the rear wheels RW, as shown in FIG. 10. In addition, the control device 302 or the like in FIG. 8 controls the PDU 303a to apply the regenerative braking torque RGtrq to the front wheels FW and the rear wheels RW (BP regenerative torque BPtrq and rear-wheel AP regenerative torque APtrq_r), as shown in FIG. 10. Thus, on the condition that the brake pedal 309b is stepped, the engine ECU 310a, the control device 302, or the like applies the target braking torque TGTtrq to the front wheels FW and the rear wheels RW for the vehicle 301 to generate a braking force equivalent to the requested braking force.

Note that, on the condition that the accelerator pedal 309a (see FIG. 8) has been released but the brake pedal 309b (see FIG. 8) is not stepped, the engine ECU 310a, the control device 302, or the like calculates the target braking torque TGTtrq in accordance such as with the vehicle body speed of the vehicle 301. For example, on the condition that a control map, in which the target braking torque TGTtrq has been set with respect to the vehicle body speed of the vehicle 301, is set in advance, the engine ECU 310a, the control device 302, or the like refers to the control map for calculating the target braking torque TGTtrq with respect to the vehicle body speed of the vehicle 301. This causes the vehicle 301 to generate a braking force equivalent to the engine brake at a time of the accelerator pedal 309a being released.

Figure 12:
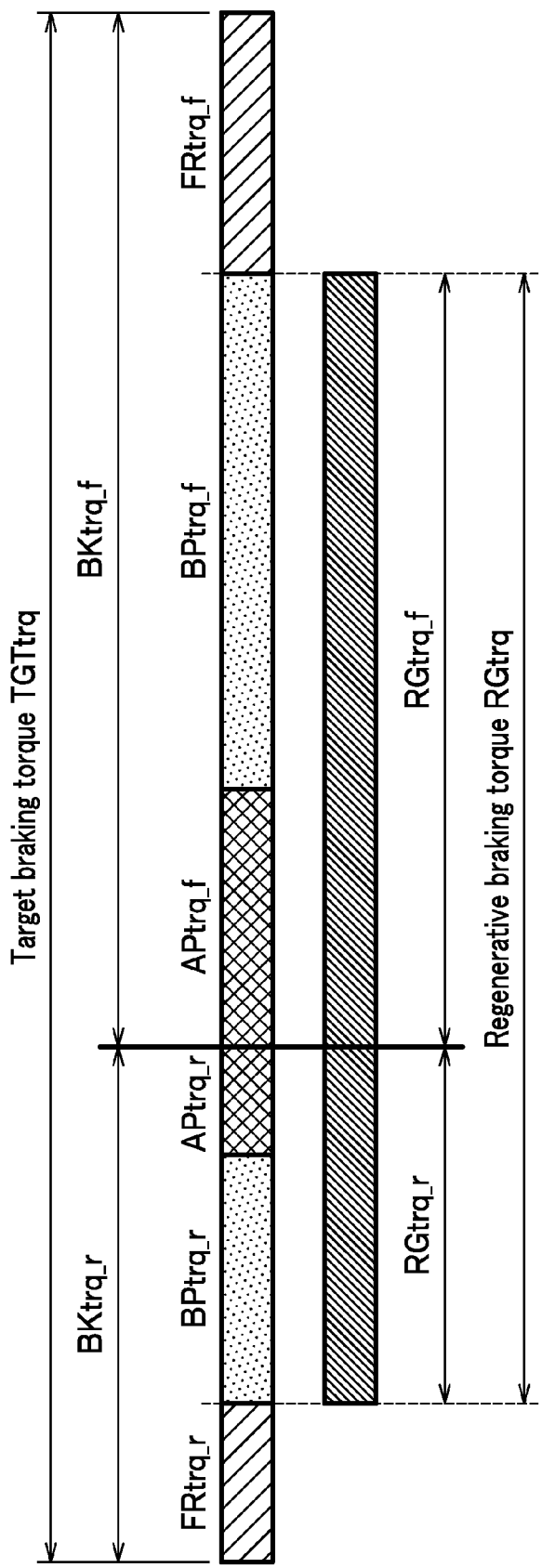
FIG. 12 is a chart indicating the target braking torque to be applied to the wheels of the vehicle traveling in the four-wheel EV mode in the second embodiment of the present invention.

FIG. 12 is a chart indicating the target braking torque to be applied to the wheels of the vehicle traveling in the four-wheel EV mode.

On the condition that the vehicle 301 in FIG. 8 travels in the four-wheel EV mode, unlike the case of traveling in the rear wheel EV mode as shown in FIG. 10, the AP regenerative torque APtrq causing the AP-OFF braking force is distributed to the front wheels FW too. Then, as shown in FIG. 12, the target braking torque TGTtrq for the vehicle 301 to generate a braking force is distributed and applied to the front wheels FW and the rear wheels RW at the braking-force distribution ratio.

On the condition that the brake pedal 309b (see FIG. 8) is stepped, the front wheels FW in FIG. 8 are applied with a front-wheel regenerative braking torque RGtrq_f (front-wheel AP regenerative torque APtrq_f and front-wheel BP regenerative torque BPtrq_f) and the front-wheel frictional braking torque FRtrq_f. Also, the rear wheels RW are applied with the rear-wheel regenerative braking torque RGtrq_r (rear-wheel AP regenerative torque APtrq_r and rear-wheel BP regenerative torque BPtrq_r) and the rear-wheel frictional braking torque FRtrq_r. Note that the front-wheel regenerative braking torque RGtrq_f indicates the regenerative braking torque RGtrq to be distributed to the front wheels FW, and the front-wheel AP regenerative torque APtrq_f indicates the AP regenerative torque APtrq to be distributed to the front wheels FW.

Here, the sum of the front-wheel AP regenerative torque APtrq_f, the front-wheel BP regenerative torque BPtrq_f, and the front-wheel frictional braking torque FRtrq_f is the braking torque to be applied to the front wheels FW (front-wheel braking torque BKtrq_f).

Also, the sum of the rear-wheel AP regenerative torque APtrq_r, the rear-wheel BP regenerative torque BPtrq_r, and the rear-wheel frictional braking torque FRtrq_r is the braking torque to be applied to the rear wheels RW (rear-wheel braking torque BKtrq_r).

The engine ECU 310a, the control device 302, or the like in FIG. 8 distributes and applies the frictional braking torque FRtrq to the front wheels FW and the rear wheels RW at the braking-force distribution ratio. Also, the engine ECU 310a, the control device 302, or the like distributes the regenerative braking torque RGtrq to the front wheels FW and the rear wheels RW at the braking-force distribution ratio. The regenerative braking torque RGtrq to be distributed to the front wheels FW is referred to as the front-wheel regenerative braking torque RGtrq_f, and the regenerative braking torque RGtrq to be distributed to the rear wheels RW is referred to as the rear-wheel regenerative braking torque RGtrq_r. The front-wheel regenerative braking torque RGtrq_f and the rear-wheel regenerative braking torque RGtrq_r have a ratio of the braking-force distribution ratio.

In addition, the sum of the front-wheel AP regenerative torque APtrq_f and the front-wheel BP regenerative torque BPtrq_f is the front-wheel regenerative braking torque RGtrq_f. Also, the sum of the rear-wheel AP regenerative torque APtrq_r and the rear-wheel BP regenerative torque BPtrq_r is the rear-wheel regenerative braking torque RGtrq_r. Besides, the sum of the front-wheel regenerative braking torque RGtrq_f and the rear-wheel regenerative braking torque RGtrq_r is the regenerative braking torque RGtrq. The regenerative braking torque RGtrq is a braking torque generated through regenerative control of the front-wheel motor-generator 311 and the rear-wheel motor-generator 312.

Further, the front-wheel AP regenerative torque APtrq_f and rear-wheel AP regenerative torque APtrq_r, the front-wheel BP regenerative torque BPtrq_f and rear-wheel BP regenerative torque BPtrq_r, and the front-wheel frictional braking torque FRtrq_f and rear-wheel frictional braking torque FRtrq_r respectively have ratios of the braking-force distribution ratio [FWrto:RWrto].

Furthermore, the control device 302 or the like of the present embodiment in FIG. 8 is configured so as to be able to execute, if it determines that the vehicle 301 has slipped at a time of braking, a function (slip reduction operation) of adjusting the front wheel braking torque BKtrq_f and the rear wheel braking torque BKtrq_r to reduce slipping.

For executing the slip reduction operation, the EDC controller 351 monitors whether the vehicle 301 has slipping. For example, the EDC controller 351 determines that the wheels have been locked to have slipping, if the wheel speeds of the front wheels FW and the rear wheels RW have rapidly decreased. In other words, the EDC controller 351 obtains a rapid reduction in the wheel speeds as a change in vehicle conditions to determine based on the change in vehicle conditions that the vehicle 301 has been slipping.

Moreover, on the condition that the vehicle 301 includes a yaw rate sensor (not shown) and/or a lateral acceleration sensor (not shown), the EDC controller 351 may determine that the vehicle 301 has slipped, if the vehicle 301 has experienced an irregular yawing or a lateral acceleration. In this case, the EDC controller 351 obtains an incident that the vehicle 301 has experienced an irregular yawing or a lateral acceleration as a change in vehicle conditions, to determine based on the change in the vehicle conditions that the vehicle 301 has been slipping.

Thus, the EDC controller 351 has a function of determining whether the vehicle 301 is slipping based on the vehicle conditions. That is, in the present embodiment, the EDC controller 351 is the slip state detector that detects based on the vehicle condition that the vehicle 301 is slipping.

Note that, as described above, the VSA controller 350 included in the vehicle 301 is configured to be capable of executing the antilock brake control. The VSA controller 350 executes the antilock brake control on the condition that it detects that the vehicle 301 is slipping.

For example, the VSA controller 350 obtains a rapid reduction in the wheel speed as a variation in a vehicle condition, as is the case with the EDC controller 351, to determine based on the variation in the vehicle condition that the vehicle 301 is slipping.

Then, a variation in a vehicle condition (reduction in the wheel speed), by which the EDC controller 351 of the present embodiment determines that the vehicle 301 is slipping, is set smaller than that by which the VSA controller 350 determines that the vehicle 301 is slipping. In other words, the EDC controller 351 is configured to be capable of determining that the vehicle 301 is slipping by a variation in the vehicle condition (reduction in the wheel speed) which is smaller than a variation in the vehicle condition (reduction in the wheel speed) for the VSA controller 350 to determine that the vehicle 301 is slipping. This allows the EDC controller 351 to detect that the vehicle 301 is slipping before the VSA controller 350 executing the antilock brake control. Then, the slip reduction operation is executed by the EDC controller 351 at an earlier stage (i.e., in a state that the vehicle 301 is slipping little) than the antilock brake control to be executed by the VSA controller 350.

Figure 13:
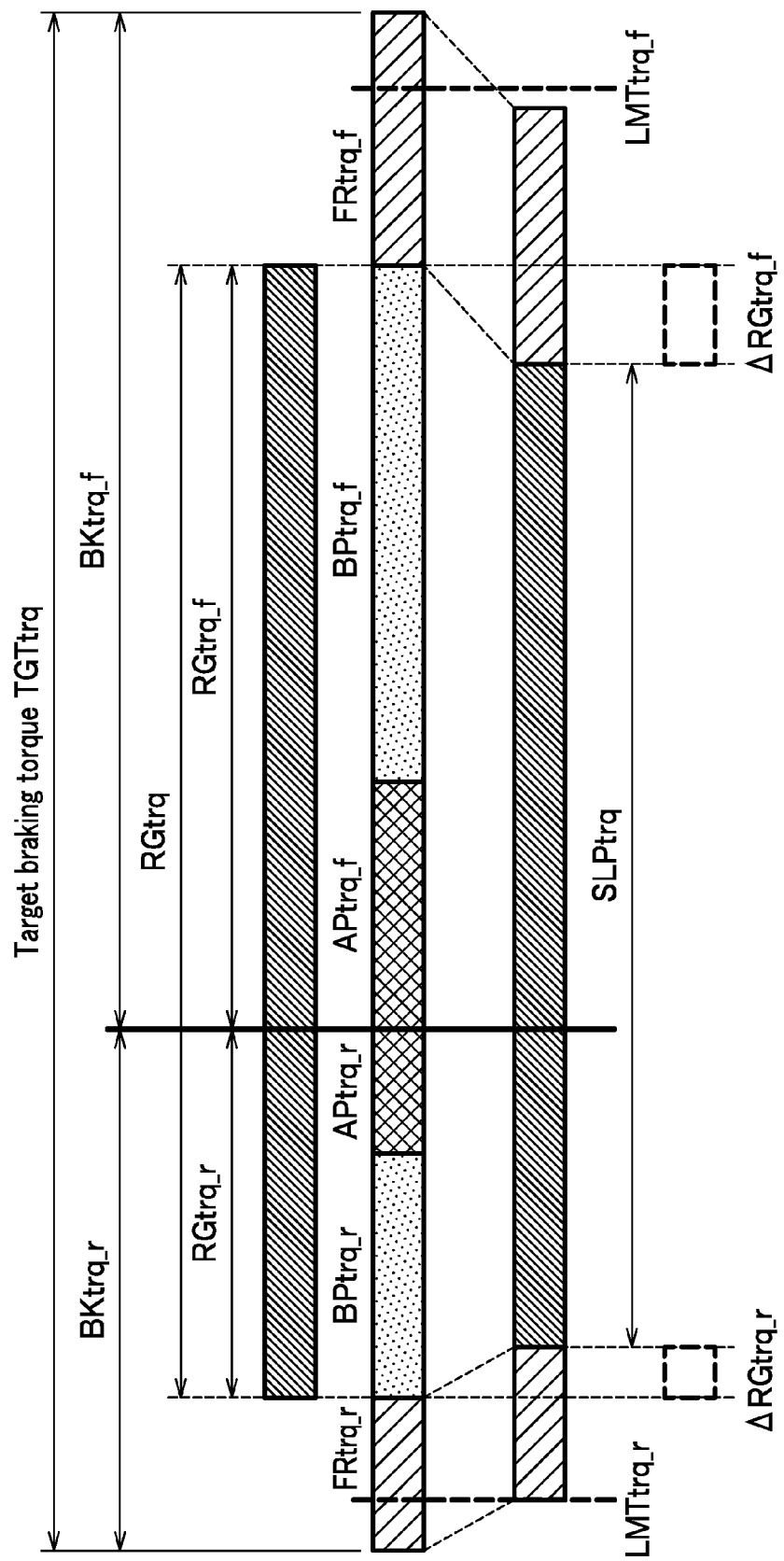
FIG. 13 is a chart indicating variations in the braking torques to be applied to the wheels when slip reduction operation is executed in the second embodiment of the present invention.

FIG. 13 is a chart indicating variations in the braking force generated in the vehicle when the slip reduction operation is executed. In addition, FIG. 14A is a chart indicating a braking force in a case where the generable regenerative torque is larger than the slip-avoidance regenerative torque, and FIG. 14B is a chart indicating a braking force in a case where the generable regenerative torque is smaller than the slip-avoidance regenerative torque.

On the condition that the EDC controller 351 has determined that the vehicle 301 in FIG. 8 has slipped, the control device 302 engages the front-wheel clutch 311a and the rear-wheel clutch 312a. In addition, the control device 302 controls the PDU 303a to switch the front-wheel motor-generator 311 and the rear-wheel motor-generator 312 into the regenerative mode. This allows regenerative control of the front-wheel motor-generator 311 and the rear-wheel motor-generator 312.

Further, the engine ECU 310a, the control device 302, or the like calculates the limit braking torque LMTtrq that is a limit of the braking force which can be generated in the vehicle 301 within a range of having no slip due to the wheels being locked.

Note that the control device 302 may be configured to switch the vehicle 301 into the four-wheel EV traveling mode for four-wheel driving of the vehicle 301, if the accelerator pedal 309a (see FIG. 8) is stepped on the condition that the EDC controller 351 has determined that the vehicle 301 has slipped. In other words, the control device 302 may be configured to switch the traveling mode of the vehicle 301 into a traveling mode in which the front-wheel motor-generator 311 and the rear-wheel motor-generator 312 respectively drive the front wheels FW and the rear wheels RW. This allows the vehicle 301 to have a stable traveling even on a slippery road such as a low μ road.

The slip detected by the EDC controller 351 is a smaller slip (lighter slip) than the slip detected by the VSA controller 350 for executing the antilock brake control. Accordingly, switching into the four-wheel EV driving mode may recover grip forces of the wheels to allow the EDC controller 351 to determine at an early stage that the slip has been eliminated.

Thus, if the accelerator pedal 309a is stepped, a driver-requested acceleration is achieved at an early stage even in the case where switching the traveling mode of the vehicle 301 into the four-wheel EV traveling mode has eliminated the slip.

Alternatively, switching into the front-wheel EV traveling mode if the accelerator pedal 309a has been released in the four-wheel EV traveling mode may also ensure the vehicle 301 being stable.

As shown in FIG. 11, the limit braking torque LMTtrq is determined in accordance with the deceleration ΔG of the vehicle 301 (see FIG. 8). Then, the control device 302 or the like calculates the vehicle body speed of the vehicle 301, and also calculates the deceleration ΔG based on the calculated vehicle speed. In addition, the control device 302 or the like calculates the limit braking torque LMTtrq in association with the calculated deceleration ΔG. For example, as shown in FIG. 11, on the condition that a control map indicating the limit braking torque LMTtrq (front-wheel limit braking torque LMTtrq_f and rear-wheel limit braking torque LMTtrq_r) with respect to the deceleration ΔG is set in advance, the control device 302 or the like can refer to the control map to calculate the limit braking torque LMTtrq (front-wheel limit braking torque LMTtrq_f and rear-wheel limit braking torque LMTtrq_r) in association with the deceleration ΔG.

As shown in FIG. 13, if the rear-wheel braking torque BKtrq_r applied to the rear wheels RW is greater than the rear-wheel limit braking torque LMTtrq_r, the EDC controller 351 calculates the amount of reduction in the rear-wheel regenerative braking torque RGtrq_r (ΔRGtrq_r) for the rear-wheel braking torque BKtrq_r to be reduced to the rear-wheel limit braking torque LMTtrq_r.

In addition, the EDC controller 351 calculates the amount of reduction in the front-wheel regenerative braking torque RGtrq_f (ΔRGtrq_f). At this time, the control device 302 (EDC controller 351) or the like determines the amount of reduction in the front-wheel regenerative braking torque RGtrq_f (ΔRGtrq_f) so that the reduction amount of the front-wheel regenerative braking torque RGtrq_f (ΔRGtrq_f) and that of the rear-wheel regenerative braking torque RGtrq_r (ΔRGtrq_r) have a ratio of the braking-force distribution ratio [FWrto:RWrto].

Then, the control device 302 (EDC controller 351) or the like controls the PDU 303a to reduce the front-wheel regenerative braking torque RGtrq_f to be applied by the front-wheel motor-generator 311 by the amount of reduction (ΔRGtrq_f), and to reduce the rear-wheel regenerative braking torque RGtrq_r to be applied by the rear-wheel motor-generator 312 by the amount of reduction (ΔRGtrq_r), as shown in FIG. 13.

This reduces the rear-wheel braking torque BKtrq_r to be applied to the rear wheels RW to the rear-wheel limit braking torque LMTtrq_r.

In addition, the front-wheel braking torque BKtrq_f to be applied to the front wheels FW and the rear-wheel braking torque BKtrq_r to be applied to the rear wheels RW are maintained to have a ratio of the braking-force distribution ratio.

A regenerative braking torque RGtrq to be applied to the wheels through the front-wheel braking torque BKtrq_f and the rear-wheel braking torque BKtrq_r during the slip reduction operation is referred to as a slip-avoidance regenerative torque SLPtrq.

While the EDC controller 351 is executing the slip reduction operation, the control device 302 or the like monitors such as the state of charge of the battery 303 to calculate the generable regenerative torque MOtrq. The control device 302 or the like calculates the generable regenerative torque MOtrq at an interval set in advance.

Then, the control device 302 or the like compares the calculated slip-avoidance regenerative torque SLPtrq with the calculated generable regenerative torque MOtrq.

If the generable regenerative torque MOtrq is greater than the slip-avoidance regenerative torque SLPtrq, the control device 302 or the like determines that all the calculated slip-avoidance regenerative torque SLPtrq can be generated. Then, as shown in FIG. 14A, the control device 302 or the like controls the PDU 303a to make the front-wheel and rear-wheel motor-generators 311, 312 generate the slip-avoidance regenerative torque SLPtrq.

Adversely, if the generable regenerative torque MOtrq is smaller than the slip-avoidance regenerative torque SLPtrq, as shown in FIG. 14B, the control device 302 (EDC controller 351) in FIG. 8 or the like determines that all the calculated slip-avoidance regenerative torque SLPtrq cannot be generated. Then, the control device 302 or the like sets the generable regenerative torque MOtrq to be a new slip-avoidance regenerative torque SLPtrq. At this time, the control device 302 or the like distributes the slip-avoidance regenerative torque SLPtrq to the front wheels FW and the rear wheels RW so that the amount of reduction in the front-wheel regenerative braking torque RGtrq_f (ΔRGtrq_f) and that in the rear-wheel regenerative braking torque RGtrq_r (ΔRGtrq_r) have a ratio of the braking-force distribution ratio [FWrto:RWrto].

The control device 302 or the like controls the PDU 303a to make the front-wheel and rear-wheel motor-generators 311, 312 generate the slip-avoidance regeneration torque SLPtrq, which has newly been set, so as to be applied to the front wheels FW and the rear wheels RW.

In addition, as the slip-avoidance regenerative torque SLPtrq is reduced, the rear-wheel braking torque BKtrq_r to be applied to the rear wheels RW is smaller than the rear-wheel limit braking torque LMTtrq_r. Then, the control device 302 (ESB controller 304a) or the like controls the fluid pressure generator 304b to add the frictional braking torque FRtrq. In other words, the control device 302 (ESB controller 304a) or the like makes an additional front-wheel frictional torque FRtrq_fa applied to the front wheels FW, and makes an additional rear-wheel frictional torque FRtrq_ra applied to the rear wheels RW. The control device 302 (ESB controller 304a) or the like controls the fluid pressure generator 304b so that the additional front-wheel frictional torque FRtrq_fa and the additional rear-wheel frictional torque FRtrq_ra have a ratio of the braking-force distribution ratio [FWrto:RWrto].

The rear wheels RW are applied with the rear-wheel braking torque BKtrq_r consisting of the rear-wheel regenerative braking torque RGtrq_r, the rear-wheel frictional braking torque FRtrq_r, and the additional rear-wheel frictional torque FRtrq_ra. Also, the front wheels FW are applied with front-wheel braking torque BKtrq_f consisting of the front-wheel regenerative braking torque RGtrq_f, the front-wheel frictional braking torque FRtrq_f, and the additional front-wheel frictional torque FRtrq_fa. In addition, the front-wheel braking torque BKtrq_f to be applied to the front wheels FW and the rear-wheel braking torque BKtrq_r to be applied to the rear wheels RW are maintained to have a ratio of the braking-force distribution ratio.

In this way, while executing the slip reduction operation, the control device 302 or the like compares the calculated slip-avoidance regenerative torque SLPtrq with the calculated generable regenerative torque MOtrq to select a smaller one. The control device 302 or the like sets the selected one to be a new slip-avoidance regenerative torque SLPtrq. Then, the control device 302 or the like controls the PDU 303a to apply the slip-avoidance regenerative torque SLPtrq, which has newly been set, to the front wheels FW and the rear wheels RW.

In addition, if the rear-wheel braking torque BKtrq_r to be applied to the rear wheels RW is smaller than the rear-wheel limit braking torque LMTtrq_r, the control device 302 or the like sets the additional rear-wheel frictional torque FRtrq_ra to be newly applied to the rear wheels RW. Also, the control device 302 or the like sets the additional front-wheel frictional torque FRtrq_fa to be newly applied to the front wheels FW. The control device 302 or the like sets the additional front-wheel frictional torque FRtrq_fa so that the additional front-wheel frictional torque FRtrq_fa and the additional rear-wheel frictional torque FRtrq_ra have a ratio of the braking-force distribution ratio [FWrto:RWrto].

Then, the control device 302 or the like controls the fluid pressure generator 304b to apply the additional front-wheel frictional torque FRtrq_fa to the front wheels FW, and to apply the additional rear-wheel frictional torque FRtrq_ra to the rear wheels RW. This makes the rear-wheel braking torque BKtrq_r equivalent to the rear-wheel limit braking torque LMTtrq_r applied to the rear wheels RW.

During the slip reduction operation, the slip-avoidance regenerative torque SLPtrq is set within a range of the generable regenerative torque MOtrq. Accordingly, even when the EDC controller 351 is executing the slip reduction operation, the front wheels FW and the rear wheels RW are applied with the regenerative braking torque RGtrq (slip-avoidance regenerative torque SLPtrq) within a range of the generable regenerative torque MOtrq. In addition, as the additional rear-wheel frictional torque FRtrq_ra is applied to the rear wheels RW, the rear wheels RW are applied with the rear-wheel braking torque BKtrq_r equivalent to the rear-wheel limit braking torque LMTtrq_r. Further, the front-wheel braking torque BKtrq_f and the rear-wheel braking torque BKtrq_r are maintained to have a ratio of the braking-force distribution ratio.

Therefore, even during the slip reduction operation, the front wheels FW and the rear wheels RW are applied with braking torques which have been distributed at the braking-force distribution ratio.

Note that the present invention is not limited to the aforementioned embodiments, and can be suitably modified in design without departing from the spirit of the invention.

For example, the two front wheels FW and the two rear wheels RW in FIG. 8 may be configured so as to be respectively driven by the front-wheel motor-generators 311 and the rear-wheel motor-generators 312. In other words, four motor-generators of the two front-wheel motor-generators 311 and the two rear-wheel motor-generators 312 may be included in the configuration.

In addition, the present invention may be applied to a vehicle in which the rear wheels RW (see FIG. 8) can be driven by the engine 310 (see FIG. 8).

Further, the present invention may be applied to a vehicle having either one or more than two wheels as front wheel(s) FW and/or rear wheel(s) RW.

The invention claimed is:

1. A braking force control system comprising:
  a regenerative braking force controller that controls a regenerative braking force for rear wheels of a vehicle, which is generated by a first motor-generator for driving the rear wheels;
  a frictional braking force controller that controls a frictional braking force to be generated by the rear wheels of the vehicle; and
  a braking force determiner that determines the frictional braking force and the regenerative braking force inclusive of a braking force equivalent to an engine brake, so that a total braking force to be applied to the rear wheels does not exceed a rear preset value
  wherein the braking force determiner sets the rear preset value based on a target braking force distribution to the rear wheels, with which the rear wheels are not locked, and
  wherein the target braking force distribution to the rear wheels is determined based at least on a road surface condition and a vehicle load.

2. The braking force control system according to claim 1, wherein the braking force determiner sets a front preset value so as to be smaller than a limit value of a braking force for front wheels of the vehicle to be locked.

3. The braking force control system according to claim 1, wherein the regenerative braking force controller also controls the regenerative braking force for front wheels to be generated by a second motor-generator for driving the front wheels of the vehicle; and
  the frictional braking force controller also controls the frictional braking force to be generated by the front wheels of the vehicle, includes a slip state detector for detecting that the vehicle is slipping, and, on the condition that the slip state detector detects the vehicle for which the regenerative braking force is being generated is slipping, reduces at a predetermined ratio the regenerative braking force being applied to the front wheels and the regenerative braking force being applied to the rear wheels.

4. The braking force control system according to claim 3, wherein the predetermined ratio is a target distribution ratio for distributing the frictional braking force to the front and rear wheels.

5. The braking force control system according to claim 3, wherein the predetermined ratio is set so that a sum of the frictional braking force and regenerative braking force to be applied to the rear wheels does not exceed a limit braking force for the rear wheels to be locked.

6. The braking force control system according to claim 1, further comprising:
  an Antilock Braking System (ABS) controller that executes antilock brake control for reducing the frictional braking force upon detecting that the vehicle is slipping,
  wherein the slip state detector detects that the vehicle is slipping, to reduce the regenerative braking forces to be applied to the front and rear wheels, with a variation in a vehicle condition which is smaller than that of the ABS controller detecting that the vehicle is slipping.

7. The braking force control system according to claim 1, wherein if an accelerator pedal is stepped for operation at a time of a slip state detector detecting that the vehicle is slipping, a traveling mode is switched to one in which the front and rear wheels are driven by the first and second motor-generators, respectively.

8. A braking force control system comprising:
  a regenerative braking force controller that controls a regenerative braking force for rear wheels of a vehicle, which is generated by a first motor-generator for driving the rear wheels;
  a frictional braking force controller that controls a frictional braking force to be generated by the rear wheels of the vehicle; and
  a braking force determiner that determines the frictional braking force and the regenerative braking force inclusive of a braking force equivalent to an engine brake, so that a total braking force to be applied to the rear wheels does not exceed a rear preset value;

wherein:

the braking force determiner sets a front preset value so as to be smaller than a limit value of the braking force for front wheels of the vehicle to be locked;

the regenerative braking force controller also controls the regenerative braking force for the front wheels to be generated by a second motor-generator for driving the front wheels of the vehicle;

the frictional braking force controller also controls the frictional braking force to be generated by the front wheels of the vehicle; and the braking force determiner sets in advance distributions to the frictional braking force of the frictional braking force to be generated by the front wheels and the frictional braking force to be generated by the rear wheels, and, on a condition that a deceleration of the vehicle is within a predetermined range, makes the distribution of the frictional braking force to be generated by the rear wheels, in accordance with the preset distribution, smaller than the limit value for the rear wheels to be locked, and makes the distribution of the frictional braking force to be generated by the front wheels larger than a limit value for the front wheels to be locked.

* * * * *